(12) United States Patent
Dewar

(10) Patent No.: US 8,086,558 B2
(45) Date of Patent: Dec. 27, 2011

(54) COMPUTER-IMPLEMENTED SYSTEM FOR HUMAN RESOURCES MANAGEMENT

(75) Inventor: Katrina Dewar, Plymouth, MN (US)

(73) Assignee: PreVisor, Inc., Roswell, GA (US)

( * ) Notice: Subject to any disclaimer, the term of this patent is extended or adjusted under 35 U.S.C. 154(b) by 0 days.

(21) Appl. No.: 12/539,166

(22) Filed: Aug. 11, 2009

(65) Prior Publication Data

US 2010/0042574 A1    Feb. 18, 2010

Related U.S. Application Data

(63) Continuation of application No. 09/878,245, filed on Jun. 12, 2001, now Pat. No. 7,606,778.

(60) Provisional application No. 60/211,044, filed on Jun. 12, 2000.

(51) Int. Cl.
 *G06F 15/00* (2006.01)
(52) U.S. Cl. .................................................. 706/62
(58) Field of Classification Search ..................... 706/62
 See application file for complete search history.

(56) References Cited

U.S. PATENT DOCUMENTS

| | | | |
|---|---|---|---|
| 5,059,127 A | 10/1991 | Lewis |
| 5,117,353 A | 5/1992 | Stipanovich |
| 5,164,897 A | 11/1992 | Clark |
| 5,170,362 A | 12/1992 | Greenberg |
| 5,197,004 A | 3/1993 | Sobotka |
| 5,325,862 A | 7/1994 | Lewis |
| 5,326,270 A | 7/1994 | Ostby |
| 5,371,807 A | 12/1994 | Register |
| 5,408,588 A | 4/1995 | Ulug |
| 5,416,694 A | 5/1995 | Parrish |
| 5,461,699 A | 10/1995 | Arbabi |
| 5,467,428 A | 11/1995 | Ulug |
| 5,490,097 A | 2/1996 | Swenson |
| 5,551,880 A | 9/1996 | Bonnstetter |
| 5,565,316 A | 10/1996 | Kershaw |
| 5,592,375 A | 1/1997 | Salmon |
| 5,608,899 A | 3/1997 | Li |
| 5,618,182 A | 4/1997 | Thomas |
| 5,671,409 A | 9/1997 | Fatseas |

(Continued)

FOREIGN PATENT DOCUMENTS

WO    WO 99/17242 A2    4/1999

(Continued)

OTHER PUBLICATIONS

Ed Rubinstein ("Operators embrace automated systems to hire the best, reduce turnover" 1997).*

(Continued)

*Primary Examiner* — Michael B Holmes
*Assistant Examiner* — Lut Wong
(74) *Attorney, Agent, or Firm* — Patterson Thuente Christensen Pedersen, P.A.

(57) ABSTRACT

A system and method for testing and/or evaluating employees or potential employees is disclosed. A computer arranges a plurality of applicants in a stack ranked table. The table may rank or re-rank applicants against each other, from best to worst, after successive screening, selecting, and/or interviewing stages for a particular job. Performance evaluations of hired workers may be fed back to the computer for adjusting the system and method. Competencies shown to be predictive of successful performance of a given type of job are tested for at various stages in an online testing system.

17 Claims, 11 Drawing Sheets

U.S. PATENT DOCUMENTS

| | | | |
|---|---|---|---|
| 5,722,418 A | 3/1998 | Bro |
| 5,727,128 A | 3/1998 | Morrison |
| 5,774,883 A | 6/1998 | Anderson |
| 5,788,504 A | 8/1998 | Rice |
| 5,794,178 A | 8/1998 | Caid |
| 5,799,282 A | 8/1998 | Rakshit |
| 5,827,070 A | 10/1998 | Kershaw |
| 5,832,497 A | 11/1998 | Taylor |
| 5,885,087 A | 3/1999 | Thomas |
| 5,887,120 A | 3/1999 | Wical |
| 5,974,392 A | 10/1999 | Endo |
| 5,978,767 A | 11/1999 | Chriest |
| 5,978,768 A | 11/1999 | McGovern |
| 5,980,096 A | 11/1999 | Thalhammer-Reyero |
| 5,999,909 A | 12/1999 | Rakshit |
| 6,035,295 A | 3/2000 | Klein |
| 6,049,776 A | 4/2000 | Donnelly |
| 6,056,556 A | 5/2000 | Braun |
| 6,061,675 A | 5/2000 | Wical |
| 6,070,143 A | 5/2000 | Barney |
| 6,086,382 A | 7/2000 | Thomas |
| 6,094,650 A | 7/2000 | Stoffel |
| 6,115,646 A | 9/2000 | Fiszman |
| 6,115,718 A | 9/2000 | Huberman |
| 6,126,448 A | 10/2000 | Ho |
| 6,144,838 A | 11/2000 | Sheehan |
| 6,144,964 A | 11/2000 | Breese |
| 6,189,029 B1 | 2/2001 | Fuerst |
| 6,213,780 B1 | 4/2001 | Ho |
| 6,263,334 B1 | 7/2001 | Fayyad |
| 6,266,658 B1 | 7/2001 | Adya |
| 6,266,659 B1 | 7/2001 | Nadkarni |
| 6,269,479 B1 | 7/2001 | Puram |
| 6,272,467 B1 | 8/2001 | Durand |
| 6,275,812 B1 | 8/2001 | Haq |
| 6,289,340 B1 | 9/2001 | Puram |
| 6,311,164 B1 | 10/2001 | Ogden |
| 6,334,133 B1 | 12/2001 | Thompson |
| 6,338,628 B1 | 1/2002 | Smith |
| 6,341,267 B1 | 1/2002 | Taub |
| 6,370,510 B1 | 4/2002 | McGovern |
| 6,385,620 B1 | 5/2002 | Kurzius |
| 6,405,159 B2 | 6/2002 | Bushey |
| 6,442,370 B1 | 8/2002 | Driscoll |
| 6,463,430 B1 | 10/2002 | Brady |
| 6,466,914 B2 | 10/2002 | Mitsuoka |
| 6,484,010 B1 | 11/2002 | Sheehan |
| 6,493,723 B1 | 12/2002 | Busche |
| 6,513,027 B1 | 1/2003 | Powers |
| 6,513,042 B1 | 1/2003 | Anderson |
| 6,514,079 B1 | 2/2003 | McMenimen |
| 6,514,084 B1 | 2/2003 | Thomas |
| 6,524,109 B1 | 2/2003 | Lacy |
| 6,564,197 B2 | 5/2003 | Sahami |
| 6,567,784 B2 | 5/2003 | Bukow |
| 6,591,246 B1 | 7/2003 | Tuttle |
| 6,598,047 B1 | 7/2003 | Russell |
| 6,611,822 B1 | 8/2003 | Beams |
| 6,618,734 B1 | 9/2003 | Williams |
| 6,640,216 B1 | 10/2003 | Loofbourrow |
| 6,662,194 B1 | 12/2003 | Joao |
| 6,681,098 B2 | 1/2004 | Pfenninger |
| 6,691,122 B1 | 2/2004 | Witte |
| 6,711,585 B1 | 3/2004 | Copperman |
| 6,721,754 B1 | 4/2004 | Hurst |
| 6,728,695 B1 | 4/2004 | Pathria |
| 6,735,570 B1 | 5/2004 | Lacy |
| 6,742,002 B2 | 5/2004 | Arrowood |
| 6,769,066 B1 | 7/2004 | Botros |
| 6,778,979 B2 | 8/2004 | Grefensette |
| 6,778,995 B1 | 8/2004 | Gallivan |
| 6,795,799 B2 | 9/2004 | Deb |
| 6,847,966 B1 | 1/2005 | Sommer |
| 6,853,966 B2 | 2/2005 | Bushey |
| 6,857,877 B1 | 2/2005 | Watanabe |
| 6,865,581 B1 | 3/2005 | Cloninger |
| 6,865,608 B2 | 3/2005 | Hunter |
| 6,873,964 B1 | 3/2005 | Williams |
| 6,917,952 B1 | 7/2005 | Dailey |
| 6,944,596 B1 | 9/2005 | Gray |
| 7,043,443 B1 | 5/2006 | Firestone |
| 7,080,057 B2 | 7/2006 | Scarborough |
| 7,161,705 B2 | 1/2007 | Klassen |
| 7,191,138 B1 | 3/2007 | Roy |
| 7,191,139 B2 | 3/2007 | Roy |
| 7,200,563 B1 | 4/2007 | Hammitt |
| 7,249,046 B1 | 7/2007 | Katsurabayashi |
| 7,310,626 B2 | 12/2007 | Scarborough |
| 7,356,484 B2 | 4/2008 | Benjamin |
| 7,383,241 B2 | 6/2008 | Velipasaoglu |
| 7,437,309 B2 | 10/2008 | Magrino |
| 7,505,919 B2 | 3/2009 | Richardson |
| 7,555,441 B2 | 6/2009 | Crow |
| 2001/0011280 A1 | 8/2001 | Gilbert |
| 2001/0031457 A1 | 10/2001 | Pfenninger |
| 2001/0034630 A1 | 10/2001 | Mayer et al. |
| 2001/0042000 A1 | 11/2001 | Defoor, Jr. |
| 2002/0019940 A1 | 2/2002 | Matteson |
| 2002/0042786 A1 | 4/2002 | Scarborough |
| 2002/0046199 A1 | 4/2002 | Scarborough |
| 2002/0055866 A1 | 5/2002 | Dewar |
| 2002/0072946 A1 | 6/2002 | Richardson |
| 2002/0128892 A1 | 9/2002 | Farenden |
| 2002/0128893 A1 | 9/2002 | Farenden |
| 2002/0128894 A1 | 9/2002 | Farenden |
| 2002/0173971 A1 | 11/2002 | Stirpe |
| 2002/0198766 A1 | 12/2002 | Magrino |
| 2003/0037032 A1 | 2/2003 | Neece |
| 2003/0101091 A1 | 5/2003 | Levin |
| 2003/0101170 A1 | 5/2003 | Edelstein |
| 2003/0120630 A1 | 6/2003 | Tunkelang |
| 2003/0191680 A1 | 10/2003 | Dewar |
| 2003/0195786 A1 | 10/2003 | Dewar |
| 2003/0200136 A1 | 10/2003 | Dewar |
| 2005/0080657 A1 | 4/2005 | Crow |
| 2005/0114279 A1 | 5/2005 | Scarborough |
| 2005/0246299 A1 | 11/2005 | Scarborough |
| 2006/0074836 A1 | 4/2006 | Gardner |
| 2006/0282306 A1 | 12/2006 | Thissen-Roe |
| 2009/0187446 A1 | 7/2009 | Dewar |

FOREIGN PATENT DOCUMENTS

| | | |
|---|---|---|
| WO | WO 01/93102 A1 | 12/2001 |
| WO | WO 02/13095 | 2/2002 |

OTHER PUBLICATIONS

Schmidt et al ("The Validity and Utility of Selection Methods in Personnel Psychology: Practical and Theoretical Implications of 85 Years of Research Findings" 1998).*

Decision Point Data ("1999 StoreWorks! Conference and Exhibition").*

Paul W. Brooks ("Internet Assessment: Opportunities and Challenges" IPMAAC Jun. 4, 2000).*

"123 Assess Demonstration," www.tekmetrics.com website archived Jan. 28, 1999, 2 pages.

"1999 StoreWorks! Conference and Exhibition," Decision Point Data, Inc. (predecessor company of Unicru, Inc.), 13 pages, May 1999.

"ApView Main Menu," Demo, Aspen Tree Software, Inc., Jun. 13, 1997, 30 pages.

"Aspen Tree Software: The Total Solution to Employee Recruiting & Selection," Aspen Tree Software, Inc., Oct. 27, 1997, 29 pages.

"ASSESS Expert System/Bigby, Havis & Associates, Inc.", page archived from www.bigby.com, 2 pages, May 7, 1999.

"Assesspreview: Welcome to the ASSESS Internet Online Preview," page archived from www.bigby.com website, 1 page, May 8, 1999.

"CAPS—A Total Solution for Off-Site Screening and Scheduling," Demo, Aspen Tree Software, Inc. Apr. 24, 1997, 20 pages.

"Catalog,"web.archive.org/web/19981206203353/www.tekmetrics.com/catalog.html archived Dec. 6, 1998, 3 pages.

"Industry of Choice," Food Service Research Forum, 46 pages, Jan. 1997.

"Interview Guide for Tom Horn," Aspen Tree Software, Inc., Jun. 13, 1997, 17 pages.

"Nov. 18, 1997: More Firms Recruit Via the Internet," The Boston Globe, 2 pages, Nov. 14, 1997.
PR Newswire: TekMetrics Help EDS Select Top Sales Talent Online: 3 pages, http://www.google.com/search?hl=en&q+cache%3Awww.findarticles.com%2Fcf_dsl%2Fm4PRN%2F1999_April%2F54502514%2Fpl%2Farticle.jhtml PR Newswire, Apr. 29, 1999.
"Profitability is Built Upon Teamwork" Decision Point Data (predecessor company of Unicru, Inc.) mailed to prospective customers, 6 pages 1997.
Saville & Holdworth, Human Resource Consulting: ApView™ Net, page archived from www.shlusa.com website, 2 pages, Apr. 29, 1999.
SHL Aspen Tree Software-Solutions for Employee Selection, page archived from www.aspentree.com website, 1 page, Dec. 1, 1998.
SHL-HR Support Tools, Analytical Process, Decision-Support Tech, page archived from www.shlusa.com website, 2 pages, Feb. 18, 1999.
"Solutions for Managers, Professionals and Supervisors," page archived from www.bigby.com website, 1 page, Feb. 9, 1999.
"TekMetrics skills assessments & skills test & resume tracking: Frequently Asked Questions," www.tekmetrics.com website archived Apr. 24, 1999, 3 pages.
"TekMetrics to Test Skills of Computer Sciences Corp. Job Candidates Over the Internet,"EDP Weekly's IT Monitor, vol. 40, Issue 16, p. 6, Apr. 19, 1999.
"Top 10 Test Scores List," www.tekmetrics.com website archived Dec. 5, 1998, 1 page.
Brooks, "Internet Assessment: Opportunities and Challenges," Paper presented to the 24th Annual IPMAAC Conference on Personnel Selection, ePredix, Inc., 6 pages, Jun. 4, 2000.
Bylinsky, et al., "Computers That Learn by Doing," Fortune, vol. 128, Issue 5, p96, 5p, 14c, 7 pages, Sep. 6, 1993.
Chang et al., "The Development of a Computer-Based Decision Support System for Use in Evaluating Candidates for the Position of Programmer-Analyst," ACM SIGCPR Computer Personnel, vol. 13, Issue 1, pp. 9-19, Apr. 1991.
Franklin, Dianna, "An Effective Way to Hire Technical Staff," User Services Conference: Proceedings of the 14th Annual ACM SIGUCCS Conference on User Services: Setting the Direction, pp. 137-142, 1986.
Glatzer, "Neural Networks Take on Real-World Problems," (Abstract) Computer World, v26, n32, p21 (1), 1 page, Aug. 10, 1992.
Goodwin, "As Job Seekers Turn to Net," (Brief Article) Computer Weekly, p6 (1), Feb. 4, 1999.
Lawton, "Genetic Algorithms for Schedule Optimization," (Cover Story) AI Expert, v7, n5, p22 (6), 7 pages, May 1992.
Lim et al., "A Method for (Recruiting) Methods: Facilitating Human Factors Input to System Design," Conference on Human Factors in Computing Systems, Proceedings of the SIGCHI Conference on Human Factors in Computing Systems, pp. 549-556, 1992.
Scarborough, "DPDNeurotech™," Power Point Presentation given to prospective employer Decision Point Data (predecessor company of Unicru, Inc.) 32 pages, electronic copy provided to Decision Point Data, Dec. 1998.
Schwartz, "Where Neural Networks are Already at Work: Putting AI to Work in the Markets," (Abstract) Business Week, n3291, p. 136(2), 1 page, Nov. 2, 1992.
Shannon, "A Mathematical Theory of Communication," Reprinted with corrections from the Bell System Technical Journal, vol. 27, pp. 379-423, 623-656, 55 pages, Jul., Oct. 1948.
U.S. Dept. of Labor, Code of Federal Regulations Pertaining to U.S. Department of labor—Uniform Guidelines on Employee Selection Procedures, (CFR, Title 41, Chapter 60, Part 60-3) 52 pages, www.dol.gov/dol/allcfr/Title_41/Part_60-3/toc.htm, 1978.
"Legal Considerations When Using Testing: White Paper," www.tekmetrics.com website archived Apr. 17, 1999, 3 pages.
"123 Assess™—Qualify Applicants in 10 Minutes!" TekMetrics, 1998, 1 page.
"An Applied Look at Reducing Adverse Impact by Differentially Weighting Selection Measures," SIOP 2000, 15th Annual Conference, Hyatt Regency, New Orleans, USA, 3 pages Apr. 14, 2000.
"Are you ready to: Are you Ready?" www.brainbench.com website archived Mar. 2, 2000, 1 page.

"Applying Neural Networking Techniques to Prediction Problems in I-O Psychology," SIOP 2000, 15th Annual Conference, Hyatt Regency, New Orleans, USA, 2 pages, Apr. 15, 2000.
"Aspen Tree Software helps lessen resume overload," PC Week, vol. 14, No. 36, p. 84, ZDNet, Aug. 25, 1997.
"Assess v.2: Technical Manual," Bigby Havis & Associates, Inc., 106 pages, Dec. 2003, describing products from 1970-2003.
"Assess v2—for Selection and Development," Bigy Havis & Associates, Inc., 5 pages, http://www.bigby.com/systems/assessv2/System/main.asp, printed Aug. 5, 2005, showing applicants from 1998.
"Assesspreview: ASSESS User Site Instructions," page archived from www.bigby.com website, 1 page, Oct. 12, 2000.
"Assesspreview: History of ASSESS," page archived from www.bigby.com website, 1 page, Oct. 11, 1999.
"Assesspreview: What is ASSESS?," page archived from www.bigby.com website, 1 page, Oct. 11, 1999.
"Automated Technologies for Biodata Prediction Systems,"SIOP 2000, 15th Annual Conference, Hyatt Regency, New Orleans, USA, 2 pages, Apr. 15, 2000.
"Before You Begin: Welcome to SSA Online Help," http://web.archive.org/web/19980118183643/http://www.coopersclub.com/inethlp2.Htm, 6 pages 1998.
"Brainbench—The Measure of Achievement: A Skills-Based Employment Market," www.brainbench.com website white paper dated Jan. 24, 2000, 9 pages.
"Brainbench—The Measure of Achievement: Completed Assessment," www.brainbench.com website archived May 1, 2003, 1 page.
"Brainbench—The Measure of Achievement: Javascript Certification," www.brainbench.com website archived Apr. 4, 2001, 3 pages.
"Brainbench—The Measure of Achievement: Mike Russiello," www.brainbench.com website archived May 1, 2003, 2 pages.
"Brainbench—The Measure of Achievement: The Rise of Online Certifications," www.brainbench.com website white paper dated Jan. 26, 2000, 8 pages.
"Brainbench—The Skills Authority: About Our Assessments," www.brainbench.com website archived May 10, 2000, 2 pages.
"Brainbench—The Skills Authority: Account Registration," www.brainbench.com website archived May 11, 2000, 2 pages.
"Brainbench—The Skills Authority: Assessment Center Demonstration," www.brainbench.com website archived May 12, 2000, 2 pages.
"Brainbench—The Skills Authority: Brainbench Certifications™," www.brainbench.com website archived May 24, 2000, 2 pages.
"Brainbench—The Skills Authority: Brainbench to Develop/Measure Talent for BTG to Staff Major Department of Education Project," www.brainbench.com website press release dated Feb. 11, 2000, 2 pages.
"Brainbench—The Skills Authority: Brainbench VP to Discuss Rapid Growth of Online Certification Industry," www.brainbench.com website press release dated May 2, 2000, 2 pages.
"Brainbench—The Skills Authority: Certifications Add Efficiency to the Employment Market," www.brainbench.com website white paper dated Jun. 7, 2000, 4 pages.
"Brainbench—The Skills Authority: Data Warehousing Specialist Certification," www.brainbench.com website archived May 10, 2000, 2 pages.
"Brainbench—The Skills Authority: Dear Affiliate," www.brainbench.com website archived May 11, 2000, 3 pages.
"Brainbench—The Skills Authority: EDS Targets Training with Brainbench Test!," www.brainbench.com website press release dated Mar. 11, 1999, 2 pages.
"Brainbench—The Skills Authority: FedSources, Inc. Teams Up with Brainbench for Online Skills Certification Service," www.brainbench.com website press release dated Oct. 22, 1999, 2 pages.
"Brainbench—The Skills Authority: Frequently Asked Questions about Brainbench Certifications™," www.brainbench.com website archived May 10, 2000, 5 pages.
"Brainbench—The Skills Authority: Global E-Market Company for Skilled Services Team with World's Largest Online Certification Authority," www.brainbench.com website press release dated Feb. 1, 2000, 2 pages.
"Brainbench—The Skills Authority: Hear What Our Customers Are Saying . . . ," www.brainbench.com website archived May 10, 2000, 6 pages.

"Brainbench—The Skills Authority: Looking for Qualified candidates?," www.brainbench.com website archived May 10, 2000, 1 page.
"Brainbench—The Skills Authority: Microsoft Chooses Brainbench Tests to Prep the Market for Windows 2000," www.brainbench.com website press release dated Feb. 17, 2000, 2 pages.
"Brainbench—The Skills Authority: Online Cert Prep™," www.brainbench.com website archived Jun. 22, 2000, 2 pages.
"Brainbench—The Skills Authority: Online Public Transcript for Chastity Sterling," www.brainbench.com website archived May 11, 2000, 3 pages.
"Brainbench—The Skills Authority: Online Skills Assessment Leader Brainbench Forms Partnership With Leading Quality-Rating Services Provider," www.brainbench.com website archived Jun. 6, 2000, 2 pages.
"Brainbench—The Skills Authority: Pricing," www.brainbench.com website archived May 10, 2000, 2 pages.
"Brainbench—The Skills Authority: Privacy Policy," www.brainbench.com website archived May 10, 2000, 2 pages.
"Brainbench—The Skills Authority: Sample Certificate," www.brainbench.com website archived May 11, 2000, 2 pages.
"Brainbench—The Skills Authority: See Where You Stand," www.brainbench.com website archived Apr. 19, 2000, 1 page.
"Brainbench—The Skills Authority: Take the Microsoft Challenge," www.brainbench.com website archived Mar. 3, 2000, 2 pages.
"Brainbench—The Skills Authority: Test Alert," www.brainbench.com website archived Jun. 21, 2000, 2 pages.
"Brainbench—The Skills Authority: Test Developer," www.brainbench.com website archived May 10, 2000, 2 pages.
"Brainbench—The Skills Authority: The Company," www.brainbench.com website archived May 11, 2000, 1 page.
"Brainbench—The Skills Authority: Top Ten Scores List," www.brainbench.com website archived May 11, 2000, 1 page.
"Brainbench—The Skills Authority: Welcome to Brainbench," www.brainbench.com website archived May 11, 2000, 2 pages.
"Companies: Registration," www.previsor.com, 8 pages, archived Jun. 2000.
"Configuring Your Hardware and Browser," Virtual Learning Technologies, http://web.archive.org/web/19980524111629/http://www.proveit.com/browser.html, 2 pages, 1998.
"Custom Job Center," DecisionPoint Systems Hirelink Network advertisement, 2 pages, provided to potential customers by Decision Point Systems (predecessor company of Unicru, Inc.), before Jan. 2000.
"DDI Launches Tech Spin-Off Targeting Small to Mid-Size Businesses," AdvantageHiring.com, http://www.advantagehiring.com/about/pr_DDIspinoff.asp, 2 pages, Sep. 17, 1999.
"DecisionPoint Systems—Hiring Technology That Gives You a Competitive Advantage," DecisionPoint Systems HirePro™ advertisement, 2 pages, provided to potential customers by Decision Point Systems (predecessor company of Unicur, Inc.) before Jan. 2000.
"DecisionPoint Systems—Imagine Being Able to Incorporate Your Company's Job Application, Skills Test, Background Checks and Tax Credit Paperwork Into One Simple Process." DecisionPoint Systems advertisement, 4 pages, provided to potential customers by Decision Point Systems (predecessor company of Unicru, Inc.), before Jan. 2000.
"Example Campus Manager Process," Bigby Havis & Associates, Inc., 3 pages, Mar. 18, 1999.
"Facts About DDI: Who We Are, What We Do," Development Dimensions International, Inc., http://www.ddiworld.com/about/pr_facts.asp, 3 pages, website visited on Nov. 2, 2004.
"Get eCertified as a Java Programmer," http://www.tekmetrics.com, 1 page, Nov. 16, 2000.
"Getting Started: 1-2-3 Assess," TekMetrics, Inc., www.tekmetrics.com, 3 pages, 1998.
"Guide to Using Assess Internet," Bigby Havis & Associates, Inc., 13 pages, Mar. 1999.
"Highlights, The Bigby, Havis Newsletters: How Our Clients Use ASSESS," page archived from www.bigby.com website, 1 page, Oct. 8, 1999.
"HirePro.com—The Technology to Select the Ideal Employee Is Now Online," DecisionPoint Systems HirePro.com advertisement, 2 pages, provided to potential customers by Decision Point Systems (predecessor company of Unicru, Inc.), before Jan. 2000.
HirePro™—Automated Hiring System, DecisionPoint Systems HirePro™ advertisement, 2 pages, provided to potential customers by Decision Point Systems (predecessor company of Unicru, Inc.), before Jan. 2000.
"HirePro™ Assessments—Application Assessment Tests for HirePro™," DecisionPoint Systems Assessment Series advertisement, 2 pages, provided to potential customers by Decision Point Systems (predecessor company of Unicru, Inc.), before Jan. 2000.
"HirePro™," DecisionPoint Systems HirePro™ advertisement, 1 page, provided to potential customers by Decision Point Systems (predecessor company of Unicru, Inc.), before Jan. 2000.
"HirePro™," Retail Direct Mail Piece, 6 pages, provided to potential customers by Decision Point Systems (predecessor company of Unicru, Inc.), before Jan. 2000.
"Interactive Interview Category Analysis Report," DPD Applicant Report, Decision Point Data, Inc. (predecessor company of Unicru, Inc.), 1 page, Apr. 1998.
"Internet chats on line to replace paper CVS," UK: Launch of an Internet CV Package, Retail Week, p. 23 (1 page), Mar. 13, 1998.
"Invoice, Assess for Internet Units," Bigby Havis & Associates, Inc., 1 page, Feb. 16, 1999.
"Know It All—Staffing Professionals," Know It All, Inc., http://web.archive.org/web/19991009154935/www.knowitallinc.com/staffing.html, 1 page, 1999.
"Know It All—Technical Recruiters," Know It All, Inc, http://web.archive.org/web/19981206160646/www.knowitallinc.com/recruiter.html, 1 page, 1998.
"Know It All—Training Directors," Know It All, Inc., http://web.archive.org/web/19991009192333/www.knowitallinc.com/training.html, 1 page, 1999.
"Know It All, Inc.: About Us," Know It All, Inc., http://web.archive.org/web/19991109161725/www.knowitallinc.com/about.html 1 page, 1999.
"Know It All, Inc.: Features and Benefits," Know It All, Inc., http://web.archive.org/web/19991110092810/www.knowitallinc.com/software.html, 2 pages 1999.
"New Approaches to Combining Multiple Assessments for Predicting Criterion Outcomes," SIOP 2000, 15$^{th}$ Annual Conference, Hyatt Regency, New Orleans, USA, 2 pages, Apr. 14, 2000.
"Online Recruiting Strategist," Hunt-Scanlon.com, http://www.hunt-scanlon.com/newsarchives/orsarchives/2000/jan.htm, 8 pages, Jan. 2000.
"Predicting Sales Success: An Examination of Alternative Predictors," SIOP 2000, 15$^{th}$ Annual Conference, Hyatt Regency, New Orleans, USA, 2 pages, Apr. 14, 2000.
"Process Complete: Assessment Results," TekMetrics, Inc., http://www.pvv.org/~kentda/cv/filer/ProgrammerAptitudeTest.html, 3 pages, 1999.
"Proposal to: [Customer Name Redacted:]: for Selection System Development—Production and Operations Job Families," Proposal #P0317R00, Development Dimensions International, Inc., 27 pages, Submitted Sep. 30, 1998.
"Proposal to: CLIENT NAME: Web-Screen Proposal," Development Dimensions International, Inc., 19 pages, 1999.
"Prove It! Demonstration Test: Welcome to Prove It!," Virtual Learning Technologies, http://web.archive.org/web/19990508182217/www.proveit.com/demo.shtml, 6 pages, 1999.
"Prove It! Features and Benefits," Know It All, Inc., http://web.archive.org/web/19991009032643/www.knowitallinc.com/features.html, 2 pages 1999.
"Prove It! Features and Benefits: Internet and Intranet Solutions," Know It All, Inc., http://web.archive.org/web/19991110011034/www.knowitallinc.com/network.html, 2 pages, 1999.
"Prove It! Results Page," Know It All, Inc., http://web.archive.org/web/19991009121500/www.knowitallinc.com/results.html, 2 pages, 1999.
"Prove It!," Virtual Learning Technologies, http://web.archive.org/web/19980524111918/http://www.proveit.com/index.html, 2 pages, 1998.

"Proveit.com Features and Advantages," Virtual Learning Technologies, http://web.archive.org/web/19990508184214/www.proveit.com/features.html, 1 page, 1998.

"Psychology Technology Design: SOLUTIONS for Selection and Development," SHRM Conference flyer, Bigby Havis & Associates, Inc., 2 pages, Jun. 1998.

"QWIZ—The Standard for Testing and Training," QWIZ, Inc., http://web.archive.org/web/19990218064159/www.qwiz.com/main.htm, 1 page, 1999.

"QWIZtek Remote Demo," http://web.archive.org/web/19981205104155/208.147.160.198/welcome.asp, 2 pages, 1998.

"QWIZtek™ Technical Skills Testing Software," http://web.archive.org/web/19981205232749/www.qwiz.com/qwiz_tek.cfm, 2 pages, 1998.

"ReportView™—Closed Loop Reporting for HirePro™," DecisionPoint Systems ReportView™ advertisement, 4 pages, provided to potential customers by Decision Point Systems (predecessor company of Unicru, Inc.), before Jan. 2000.

"Self-Organizing Maps and Commitment Profiles," SIOP 2000, 15th Annual Conference, Hyatt Regency, New Orleans, USA, 2 pages, Apr. 15, 2000.

"TechTests Product Line," Virtual Learning Technologies, http://web.archive.org/web/19980524111739/http://www.proveit.com/products.html, 3 pages, 1998.

"TeckChek—IT Skills Testing—Logistics and Scoring," Bookman Testing Services, Inc., http://web.archive.org/web/20000823160658/www.teckcheck.com/services/logistics.html, 1 page, 2000.

"TeckChek Apr. 1999 Newsletter," Bookman Testing Services, Inc., http://web.archive.org/web/19991022004537/www.teckchek.com/home/newsletter0499.html, 3 pages, Apr. 1999.

"TekMetrics E-Certifications (TM) Offered on www.CareerBuilder.com," PR Newswire, p. 9882 (2 pages), Mar. 22, 1999.

"The ASSESS System: An Assessment Tool for Consulting to Business," Professional Users Training Conference brochure, 2 pages, Jul. 22-24, 1999 and Oct. 7-9, 1999.

"The Odd Friday Report: 1 to 1® Career Opportunities," Peppers and Rogers Group, www.1to1search.com, Feb. 11, 2000, 3 pages.

"The Science Behind Our Products—Profiles International, Inc.," Profiles International, Inc., website archived May 26, 2000, 2 pages.

"Top Ten Scores List," www.brainbench.com website archived Jul. 1, 2002, listing scores from Feb. 2000, 1 page.

"Unicru—History,"http://www.unicru.com/about/history.aspx, 3 pages, website visited on Sep. 23, 2005, 3 pages, recounting events from 1987-2005.

"Welcome to C&L Springboard: Welcome to SSA Online," http://web.archive.org/web/19980118183630/www.coopersclub.com/Screen1.htm, 2 pages, 1998.

"What's New at TeckChek in IT Adaptive Test Assessment," Bookman Testing Services, Inc., http://web.archive.org/web/19990422225528/www.teckchek.com/home/whatsnew.html, 1 page, 1999.

Clainos, "Tools & Technology," International Mass Retail Association, 1999 Store Operations & Human Resources Conference, Decision Point Data, Inc. (predecessor company of Unicru, Inc.), 28 pages, Feb. 2, 1999.

Duong et al., "A System of IAC Neural Networks as the Basis for Self-Organization in a Sociological Dynamical System Simulation," *Behavioral Science*, vol. 40, pp. 275-303, 1995.

Gormley, "Personality Testing," Google Groups: alt.psychology, http://groups.google.com/group/sci.psychology.personality/browse_thread/thread/6ae48d82d3d2b686/32f496703260c483?q=personality+testing&mum=18&hl=en#32f49b703260c483, 3 pages, Jul. 21, 1998.

Jacobs, "Minimizing Risk: Hiring in the 21st Century," www.shlusa.com, Presentation to the International Personnel Management Association Counsel, SHL North America, 42 pages, Jun. 7, 2000.

Labate et al., "Employee Skills Analysis Using a Hybrid Neural Network and Expert System," IEEE International Conference on Developing and Managing Intelligent System Projects, pp. 205-211, Mar. 1993.

Lake, "Web-based Skill Testing for Computer Professionals," Computing, vol. 6, No. 5, pp. 30-32, 1998.

McCune, "A Few Good Employees (Screening and Evaluating Software for Employee Recruitment)," Management Review, vol. 87, No. 4, p. 38 (5 pages), Apr. 1998.

Mondragon et al., Implementing Web-Based HR Systems: From Recruitment to Surveys and Beyond, SIOP 2000 Workshop 5, http://www.siop.org/Conferences/00Con/Workshops/workshop5.htm, 2 pages, 2000.

Oliver, "Slouches Make Better Operators (Aspen Tree Software Designs Personnel Questionnaire and Productivity Measurement Software)," Forbes, vol. 152, No. 4, p. 104, (4 pages), Aug. 6, 1993.

Rubenstein, "Operators Embrace Automated Systems to Hire the Best, Reduce Turnover," Nation's Restaurant News, New York, vol. 31, Issue 25, pp. 71-72 (4 pages), Jun. 23, 1997.

Russiello, "Online Certifications (FREE)," CTS News Archives: wu.jobs—#202, 2 pages, Jan. 13, 1999.

Scarborough, "Decision Point Systems," Presentation to potential customer, 38 pages, ten or fewer copies left with potential customer, Wilsonville, Oregon, before Jun. 2000.

Scarborough, "Welcome, Portland State University," Presentation to about 15 people, Portland, Oregon, 20 pages, before May 2000.

Walczak, "Categorizing University Student Applicants with Neural Networks," IEEE International Conference on Neural Networks, IEEE World Congress on Computational Intelligence, vol. 6, pp. 3680-3685, 1994.

Kaatz, James Bryan, "City manager Tenure Stability: A Predictive Model Based on Perceived Council Conflict, Leadership, Effectiveness and Conflict Resolution Ability," Northern Illinois University, 1996, Abstract only, 2 pages.

Ukwendu, Michael Okey Egbosiuba, "Effects of Satisfaction with Performance Evaluation Systems on Employee Turnover," Nova Southeastern University, 1998, Abstract only, 2 pages.

Aspen Tree Software video (Length 13:44), Aspen Tree Software, Inc., Mar. 10, 1997, video file "ATS.avi".

Springboard video (Length 9:44), Aspen Tree Software, Inc. Apr. 30, 1998, video file "Coopers_Net.avi".

"All About ApView" video (Length 17:13), Aspen Tree Software, Inc., Mar. 7, 1997, video file "TRAINING.avi".

Kemp, "Knowledge-based Simulation for Teaching," Proceedings of the 1st New Zealand International Stream Conference n Artificial Neural Networks and Expert Systems; pp. 192-195, Nov. 1993.

Kirby et al., "An Analysis of Applying Artificial Neural Networks for Employee Selection," Americas Conference on Information Systems, 4 pages, 1998.

Somers, M.J. "Application of two neural network paradigms to the study of voluntary employee turnover" Journal of Applied Psychology, 84, 177-185 (1999).

Walczak, "Neural Network Models for a Resource Allocation Problem," IEEE Transactions on Systems, Man, and Cybernetics—Part B: *Cybernetics*, vol. 28, No. 2, pp. 276-284, Apr. 1998.

Bartholomew, D.J., "Note on the Measurement and Prediction of Labour Turnover," Journal of the Royal Statistical Society. Series A (General), vol. 122, No. 2, 1959, pp. 232-239, 8 pages.

Morrow et al., "Using Absenteeism and Performance to Predict Employee Turnover: Early Detection through Company Records," Journal of Vocational Behavior, vol. 55, pp. 358-374 (1999) 17 pages.

A. Ben-David and G. Ben-David, "On the Architecture and Implentation of Parallel Ordinal Machines," IEEE Transactions on Systems, Man and Cybernetics, vol. 25, No. 1, pp. 159-168, Jan. 1995.

"A Technology Case Study for Human Resource Executive," Getting the High-Tech Hiring Edge, www.workindex.com/editorial/staff/sta0301.01.asp.

Adkins et al., "Judgments of fit in the selection process: the role of work value congruence," Personnel Psychology, 1994.

Ajay K. Aggarwal et al., "Selection of Surgical Residents: A Neural Network Approach," Cybernetics and Systems: An International Journal, vol. 31, 2000, pp. 417-430.

Akeel Al-Attar, "A Hybrid GA-Heuristic Search Strategy," http://www.attar.com/pages/dev_gp.htm, Mar. 23, 2001, pp. 1-6.

Pentland, Alex and Liu, Andrew, "Modeling and Prediction of Human Behavior," M.I.T. Media Lab Perceptual Computing Technical Report, No. 433, 1999. pp. 1-7.

Appendix A. pp. 1-3. http://web.archive.org/web/19981206182136/www.nfg.com/events.

Brachman et al., "Mining Business databases," Communications of the ACM, Nov. 1996, vol. 39, No. 11, pp. 42-48.

C.A. Ntuen and J.A. Chestnut, "An Expert System for Selecting Manufacturing Workers for Training," North Carolina A & T State University, Expert System with Applications, vol. 9, No. 3, pp. 309-332, Copyright 1995.

Rosen, Carl, "Mining Database Treasures," Computing Canada, Sep. 26, 1996, vol. 22, No. 20, pp. 42-43.

Caldwell et al., "Personality Characteristics of Job Applicants and Success in Screening," Personnel Psychology, 1998.

Chambless et al., "Information—Theoretic Feature Selection for a neural behavioral Model," Proceedings of the International Joint Conference on Neural Networks, vol. 2, Jul. 15-'9, 2001, pp. 1443-1448, 6 pages.

Cohen et al., "Organizational Hiring Standard," Administrative Science Quarterly, Mar. 1986.

Criterion International, Inc., "Management Information Packet for Customer Service and Sales Selection," May 12, 2000, 33 pages.

Silberberg, D. and Thomas, R., The NASA Personnel Security Processing Expert System, National Conference on Artificial Intelligence Proceedings (AAAI), pp. 1527-1532, Aug. 4-8, 1996.

Hensher, David A., "A Comparison of the Predictive Potential of Artificial Neural Networks and Nested Logit Models for Commuter Mode Choice," transportation Research Part E: Logistic and Transportation Review, Sep. 2000, vol. 36, No. 3, pp. 155-172 (abstract only).

Marshall, David B. and English, Diana J., "Neural Network Modeling of Risk Assessment in Child Protective Services," Psychological Methods, vol. 5, No. 1, 2000 pp. 102-124.

Scarborough, David and Hollweg, Batrus, "Tutorial on the Use of Network Models for Personnel Selection," Decision Sciences Institute Southwest Region Theory and Applications Proceedings $27^{th}$ Annual Conference, Mar. 6-9, 1996, pp. 151-153.

Callaghan, Dennis, "Personalization of the Fly-SaffronOne, FrontMind Tap Advanced Technologies to Predict User Behavior, Make Recommendations," eWeek, Oct. 23, 2000, p. 52.

ePredix, Inc., "Customer Service and Potential Index," technical manual, Copyright 2001.

ePredix, Inc., "Customer Service and Potential Index," candidate test, Copyright 2001.

Hapgood, Fed, "Embedded Logic," http://www2.cio.com/archive/050100_revisit_content.html, Mar. 23, 2001, pp. 1-3.

"Testing as a Selection Tool: Another Old and Sticky managerial Human Rights Issue" by George Munchus, Journal of business Ethics, 1989.

G. David Garson, "Neural Networks an Introductory Guide for Social Scientists," New Technologies for Social Research, Sage Publications, 1998, pp. 1-194.

G. Liang and M.J. Wang, "Personnel Selection Using Fuzzy MCDM Algorithm," European Journal of Operational Research, Elsevier Science B.V., vol. 78, pp. 22-33, Copyright 1994.

Jon Doyle and Thomas Dean, "Strategic Direction in Artificial Intelligence," ACM Computing Surveys, vol. 28, No. 4, Dec. 1996, Mar. 23, 2001, pp. 653-670.

Collins, Judith M. and Clark, Murray R., "An Application of the Theory of Neural Computations to the Prediction of Workplace Behavior: An Illustration and Assessment of Network Analysis," Personnel Psychology, vol. 46, 1993, pp. 503-524.

Kulonda, Dennis J., "Reengineering Training for Performance Improvement," Portland International Conference on Technology and Innovation Management, PICMET '99, vol. 1, Jul. 25-29, 1999, pp. 333-334.

Leander Kahney, "KnowledgeMiner 2 Digs Out More Info," MacWeek, Oct. 20, 1997, vol. 11, No. 40, pp. 23-24.

Melville, "Recruit, screen and hire: Staff selection and the decision-making process," Administration in Mental health, Fall/SWinter 1977.

Jordan , Michael I. and Bishop, Christopher M., "Neural Networks," The Computer Science and Engineering Handbook, Tucker (ed.), 1996, pp. 536-556.

Mitchell, "How to Reduce the High Cost of Turnover," Lawson Software, Jul. 12, 2001, pp. 1-11, or before.

"NeuralWorks Professional II/Plus," http://www.neuralware.com/products_pro2.jsp, Jul. 28, 2001, pp. 1-3.

Page et al., "Panel: Strategic Direction in Simulation Research," Proceedings of the 1999 Winter Simulation Conference, 1999, pp. 1509-1520.

"Federal Equal Employment Opportunity Laws," www.eeoc.gov, 11 pages.

Langley, Pat and Simon, Herbert A., "Applications of Machine learning and Rule Induction," Communications of the ACM, vol. 38, No. 11, Nov. 1995, pp. 55-64.

Personnel Decisions, Inc., "PDI Customer Service Inventory Manual," $1^{st}$ ed., Copyright 1994.

Personnel Decisions, International, "How to Use PDI DiskScore," Copyright 1996, 2000.

Personnel Decisions, International, "Employment Inventory—Sales Manual," Copyright 1998.

Rees, "Information networks in labor markets," The American Economic Review, Mar. 1966.

Herschel, Richard T. and Nemati, Hami R., "CKOS and Knowledge Management: Exploring Opportunities for Using Information Exchange Protocols," ACM, 1999, pp. 42-50.

Richardson Bellows, Henry & Co., Inc., "The Candidate Profile Record," brochure, Copyright 1982, 1983, 1989.

Richardson Bellows, Henry & Co., Inc., "The Supervisory Profile Record," technical report, not dated.

Richardson Bellows, Henry & Co., Inc., "The Manager Profile Record," not dated.

Richardson Bellows, Henry & Co., Inc., "The Candidate Profile Record," not dated.

Emrich, Robert F., "The Many Advantages of using IPS Diagnostic Software," Science Curriculum Inc., H.C. Crittenden Middle School, Armonk, New York; www.sci-ips.com/ips/diagnostic_advantages.html.

Guion, Robert M., "Personnel Asessment Selection and Placement," Handbook of Industrial and Organizational Psychology, Consulting Psychologists Press, Inc., 1991, pp. 327-397.

Robert W. McLeod et al., "Predicting Credit Risk: A Neural Network Approach," Journal of Retail Banking, Fall 1993, vol. 15, No. 3, pp. 37-40.

"SaffronOne's Unique Product Features," http://www.saffrontech.com/pages/products/features.html, Mar. 22, 2001, pp. 1-2.

Sahami et al., "SONIA: A service for organizing networked information autonomously," Proceedings of the third ACM conference on Digital libraries, 1998.

Scarborough, "An Evaluation of Backpropagation Neural Network Modeling as an Alternative Methodology for Criterion Validations of Employee Selection Testing," Doctoral Dissertation (UMI Dissertation Services), University of Texas, 1995.

"Spherion, ExxonMobil expand emplo9yee-screening agreement," Industry News, www.petroretail.net/npn/2001/0201/0201msin.asp.

"Statistica Neural Networks," http://www.statsoft.com/stat_nn.html, Jul. 28, 2001, pp. 1-11.

Stokes (editor) Biodata Handbook: theory, research, and use of biographical information in selection and performance prediction, Consulting Psychologists Press, Inc., 1994. p. vii-xix, 626,650.

Mengel, Susan and Lively, William, "Using a Neural Network to Predict Student Responses," ACM, 1992, pp. 669-676.

The Wide Scale Deployment of Active data Mining Solutions, http://www.attar.com/tutor/deploy.htm, Mar. 23, 2001, pp. 1-7.

Tokunaga et al., "Career Progression in a Fortune 500 Company: Examination of the Glass ceiling," IEEE Transactions on Engineering Management, vol. 43, No. 3, 1996, pp. 2662-272.

"XpertRule Miner, The Complete Data Mining Solution," http://www.attar.com/pages/info_xm.htm, Mar. 23, 2001, pp. 1-5.

www.brainbench.com website archived on May 24, 2000.

"Adaptive Outsourcing in Cross-organizational Workflows" by Klingemann et al., CaiSE'99, 1999.

Schmidt, Exploring the Boundary Conditions for Interview Validity: Meta-Analytic, Validity Findings for a New Interview Type, Summer 1999, Personnel Psychology, v. 52, n.2, p. 445-464 (20 pages).

Kaak et al., "The Weighted Application Blank" Cornell Hotel and Restaurant Administration Quarterly, Apr. 1998.

Sahami et al. "Toward Optimal Feature Selection." In L. Saitta, editor, Machine Learning: Proceedings of the Thirteenth International Conference, pp. 281-289. Morgan Kaufman, 1996.

Martin et al. "Using a Conceptually-based Predictor of Tenure to Select Employees." Journal of Business and Psychology, vol. 13, No. 2, Winter 1998.

Stone, "Principal Selection: An application of neural network forecasting," North Carolina State University, 1993, ProQuest, 127 pages.

Hart, "Predicting the tenure outcome of teachers based on variables known at the time of application," North Carolina State University, 1997, ProQuest, 94 pages.

Development Dimensions International, Inc., "How Do You Stack Up Next to Training's New Guard?", http://web.archive.org/web/19991012021341/ddiworld.com/newguard/index.htm, 4 pages, website archived Oct. 12, 1999.

Dimpsey, et al., "A Measurement-Based Model to Predict the Performance Impact of System Modifications: A Case Study," IEEE Transactions on Parallel and Distributed Systems, vol. 6, No. 1, 1995, pp. 28-40, 13 pages.

Geralt Gabris et al., "Situational Interviews and Job Performance," Public Personnel Management, vol. 20, No. 4, p. 469, Winter 1991.

U.S. Appl. No. 09/878,245, filed Jun. 12, 2001, Inventor: Dewar.

Hayes, "Intelligent High-Volume Text Processing Using Shallow, Domain Specific Techniques," in Text-Based Intelligent Systems: Current Research and Practice in Information Extraction and Retrieval, by Paul Schafran Jacobs (Editor), pp. 227-241, Lawrence Erlbaum Assoc., 1992.

Iwanska, et al., "Fully Automatic Acquisition of Taxonmic Knowledge from Large Corpora of Texts," in Natural Lanaguge Processing and Knowledge Representation: Language for Knowledge and Knowledge for Language, by Lucja M. Iwanska and Stuart C. Shapiro (Editor), pp. 335-345, AAAI Press, 1st Edition, 2000.

Moore, et al., "Indexing by MeSH titles of Natural Language Pathology Phrases Identified on First Encounter Using the Barrier Word Method," in Computerized Natural Medical Language Processing for Knowledge Representation, pp. 29-39, North-Holland, 1989.

The design and development of a sales force automation tool using business process management software Baysan, C; Bertman, A; Maynigo, R; Norville, G.; Osborne, N; Taylor, T.; Systems and Information Engineering Design Symposium, 2005 IEEE Apr. 29, 2005 pp. 318-327.

"LensXRay" Brochure, Burning Glass Technologies, 2 pages, www.burning-glass.com/Image%20Folder/LensXRay(5_1).PDF, visited May 30, 2003.

Cugini et al., "Document Clustering in Concept Space: The NIST Information Retrieval Visualization Engine (NIRVE)," http:www.itl.nist.gov/iaui/vvrg/cugini/uicd/short-cc-paper.html, 5 pages, visited on Aug. 27, 2003.

Everett et. al., "Making Ontologies Work for Resolving Redundancies Across Documents," Communications of the ACM, vol. 45, No. 2, pp. 55-60, Feb. 2002.

Freitag et al., "Boosted Wrapper Induction," American Association for Artificial Intelligence, pp. 577-583, 2000.

Gruber, "What is an Ontology?," http://www-ksl.stanford.edu/kst/what-is-an-ontology.html, 2 pages, visited on Aug. 26, 2003.

Guarino, "Formal Ontology and Information Systems", IOS Press, Proceedings of the 1st International Conference, Trento, Italy, 1998.

Guarino et. Al., "Evaluating Ontological Decisions with Ontoclean", Communications of the ACM, vol. 45, No. 2, pp. 61-65, Feb. 2002.

Kim, "Predicting How Ontologies for the Semantic Web Will Evolve", Communications of the AMC, vol. 45, No. 2 pp. 48-54, Feb. 2002.

Maedche et al., "An Infrastructure for Searching, Reusing and Evolving Distributed Ontologies", WWW2003, The Twelfth International World Wide Web Conference, Budapest, Hungary, pp. 439-448, May 20-24, 2003.

Grosso, et al., "Knowledge Modeling at the Millennium (The Design and Evolution of Protégé—2000)," Proceedings of the 12th International Workshop on Knowledge Acquisition, Modeling and Management (KAW '99), 36 pages, Banff, Canada, Oct. 1999.

"Written Opinion of the International Searching Authority," from PCT Application No. PCT/US2004/033233, filed Oct. 8, 2004, 7 pages, Written Opinion Dated May 19, 2005.

Overholt, Alison, "True or False: You're Hireng the Right People," Fast Company, Feb. 2002, pp. 110-114.

"Unicru Launches Smart Assessment Technology that Offers Unprecedented Accuracy f or Predicting Behavior of Hourly Workforce," Business Wire, Jan. 15, 2001, 2 pages.

* cited by examiner

600

1. What is the highest grade you FINISHED in school?
   a. ○ 11th grade or lower
   b. ○ 12th grade
   c. ○ 1 year of college
   d. ○ 2 or 3 years of college
   e. ○ College graduate or higher 2. What were your grades like during your last two years in school?
   a. ○ Mostly A's
   b. ○ Mostly A's and B's
   c. ○ Mostly B's and C's
   d. ○ Mostly C's and D's
   e. ○ Mostly D's and below 3. On a job, which would you generally prefer?
   a. ○ I work best when my instructions are clear.
   b. ○ I work best when there are no interruptions
   c. ○ I work best when I'm in the mood 4. Which kind of employee do you believe is poorest - one who:
   a. ○ Refuses to work a fair share of overtime
   b. ○ Skips work and doesn't call in
   c. ○ Is a few minutes late almost every day
   d. ○ Takes home some small company property
   e. ○ Works much slower than others on the job 5. When you think about what you are going to do in the near future, you:

TRANSWORLD CONSULTING

VIEW your solutions | CREATE a new solution | BUILD interview guides solutions by ePredix™   Logout Job Solutions List: Customer Service Associates

Applicant Results
Job Title: Customer Service Associate

Date Posted: 5/25/00

View: Screening Solution

| Rank | View App. | Last Name | First Name | Date | App. Ok | Screening Solution — Educational and Work- Related Ex. | Screening Solution — Customer Service Orientation | Phone Interview — Self-Confidence | Phone Interview — Recommend | All Results — eScore | Selection Solution — Customer Focus | Selection Solution — Conscientious-ness | Selection Solution — Problem Solving | Selection Solution — Recommend | Detailed Report | Phone Interview — Enter Values | Interview |
|---|---|---|---|---|---|---|---|---|---|---|---|---|---|---|---|---|---|
| 1 | W | Jones | Katrina | 05/26/00 | OK | 7 | 9 | 8 | ✓ | ▦ | 7 | 8 | 7 | ✓ | ▦ | ▦ | Yes |
| 2 | W | Smith | Peter | 05/27/00 | OK | 7 | 8 | 7 | ✓ | ▦ | 7 | 9 | 7 | ✓ | ▦ | ▦ | No |
| 3 | W | Pace | Mary | 05/28/00 | OK | 7 | 9 | 7 | ✓ | ▦ | 7 | 9 | 8 | ✓ | ▦ | ▦ | Yes |
| 4 | W | Mitchell | Helen | 5/25/00 | OK | 6 | 8 | 7 | ✓ | ▦ | 5 | 7 | 6 | ✓ | ▦ | ▦ | Yes |
| 5 | W | Benson | Peter | 05/24/00 | OK | 6 | 7 | 6 | ✓ | ▦ | 6 | 7 | 6 | ✓ | ▦ | ▦ | No |
| 6 | W | Simpson | James | 05/25/00 | OK | 5 | 7 | 5 | ✓ | ▦ | 5 | 5 | 5 | ✓ | ▦ | ▦ | No |
| 7 | W | Russell | Jenny | 05/26/00 | OK | 5 | 6 | 5 | ✓ | ▦ | 5 | 5 | 5 | ✓ | ▦ | ▦ | No |
| 8 | W | Polcsky | Daniel | 05/25/00 | OK | 5 | 5 | 5 | ✗ | ▦ | 5 | 4 | 4 | ✗ | ▦ | ▦ | No |
| 9 | W | Cedar | Jack | 05/24/00 | OK | 4 | 5 | 4 | ✗ | ▦ | - | - | - | - | - | ▦ | - |
| 10 | W | Miller | Richard | 05/25/00 | Not OK | 4 | 4 | 4 | ✗ | ▦ | - | - | - | - | - | ▦ | - |
| 11 | W | Peterson | Alex | 05/24 | Not OK | 4 | 4 | 4 | ✗ | | - | - | - | - | - | ▦ | - |
| 12 | W | Wall | Arthur | 05/26/00 | Not OK | 3 | 4 | 3 | - | | - | - | - | - | - | | - |

( < previous )  ( continue )

©2000 ePredix, Inc. All Rights Reserved

← Back → ⇨ ⊗ ⊙ ⚐ | ⊙ Search | ⊞ Favorites | ⊙ History | ▤ ▤ ▦ ▶ ▦ ▦

Time Remaining: [    ]

800

Customer Contact

| Name: Mary Q. Public | Today's Date | Account Number: 1225637 |
|---|---|---|
| Address: 18 E. Pine Avenue | 5/8/2001 | Telephone: 1-310-645-7878 |

| Date | Memo |
|---|---|
| 01/20/2000 Jan | CO, AB, 82 |
| 02/03/2000 Mar | LT, AR, 23 |
| 03/17/2000 Mar | CO, LY, PD, 93 |
| 05/05/2000 May | CO, AB, LY, 76, 93 |
| 05/22/2000 May | LT, AR, 45 |
| 06/19/2000 June | CO, PD, 82 |
| 07/21/2000 July | CO, AB, CA |

802

Memo Codes

| LY: late payment dispute | AR: account past due courtesy call |
| AB: account balance inquiry | 23: unanswered telephone call |
| LT: send late payment notice | 45: telephone |
| CA: account closing | 76: customer change of address |
| CO: customer will make payment in 5 days | 82: sales call |
| PD: customer will make payment in 5 days | 93: customer requested supervisor |

1. What is the total number of requests for account balance?
 a. ○ 0
 b. ○ 1
 c. ○ 2
 d. ○ 3
 e. ○ 4

RETAIL CUSTOMER PROMOTIONS INQUIRY

| Retailer Discount | | Retailer Cash-back Bonus | | Today's Date |
|---|---|---|---|---|
| Starting Date: 06/01/2000 | | Starting Date: 06/01/2000 | | 6/8/2001 |

| Terms for Retailer Discount | | Terms for Retailer Cash-back Bonus | |
|---|---|---|---|
| Length of Program | 60 days | Length of program | 60 days |
| Minimum required purchase | 200.00 | Minimum required purchase | 100.00 |
| Retail discount rate | .05% | Retail cash-back rate | .025% |

COMPUTER-IMPLEMENTED SYSTEM FOR HUMAN RESOURCES MANAGEMENT

RELATED APPLICATION

This application claims the benefit of U.S. patent application Ser. No. 09/878,245, filed Jun. 12, 2001, which claims priority to U.S. Provisional Application No. 60/211,044, filed Jun. 12, 2000, which is incorporated herein in its entirety by reference.

BACKGROUND OF THE INVENTION

To prevent discrimination in job hiring and promotion, in 1978 the U.S. Federal Government established rigorous standards known as the "Uniform Guidelines" for the use of testing and screening instruments used to distinguish among candidates for a given position. (41 CFR §§60-3). These standards are designed to prevent testing and screening instruments from creating an adverse impact on any minority or protected groups during the hiring or promotion of employees.

Over the last twenty years, a number of test booklets have been developed and published by various publishers in compliance with the "Uniform Guidelines." One example is the Customer Service & Clerical Potential Inventory ("CSCPI") developed by Richardson, Bellows, Henry and Co., Inc. The CSCPI is unlike most other tests in that responses are not right or wrong in the traditional sense. Instead, the performance of the group picking each individual item alternative has been statistically correlated across large samples of potential and actual employees for a position so as to create a test that can produce a total score for that position. This total score may legally be used as a factor in the hiring or promotion process.

With the advances in computer systems and the advent of the Internet, many different aspects of human resources management have been computerized, including online recruiting. In large part due to the rigorous standards imposed by the "Uniform Guidelines," such online recruiting systems use only certain minimum candidate qualifications (e.g., college level degree, possesses a driver's license, number of years experience for a skill) as a way of identifying potential candidates for a position. It has generally been accepted in the human resources profession that choosing among potential candidates based only on minimum candidate qualifications will not run afoul of the rigorous standards imposed by the "Uniform Guidelines".

Accordingly, it would be desirable to provide a computer-implemented system for human resources management that could overcome these limitations and provide further advantages in the testing and/or evaluating employees or potential employees.

SUMMARY OF THE INVENTION

The present invention is an electronic prediction system for assessing a suitability of job applicants for an employer. The electronic prediction system includes a plurality of terminals connected to the Internet, an applicant screening server connected through the Internet to the terminals that has a testing computer program that stores test data. A website identified is configured to present application questions to the applicants at the terminals and to receive applicant responses entered at the terminals in response to presentation of the application questions. The application questions include requirements questions eliciting information on whether the applicants meet employment requirements and a set of validated questions validated by correlating job performance ratings of a plurality of hired workers with previous responses given by the workers to the application questions before the workers were hired. The set of validated questions is a short subset of a large assessment selected to serve as a fast job-related pre-screen. A scoring system automatically scores the applicant responses in real time. The scoring system compares the applicant responses for requirements questions to employer requirements and being validated to predict both performance and turnover potential. A scoring database is connected to the applicant screening server. An applicant input system located on the employer's premises is configured to administer an in-depth assessment to an applicant at the employer's premises after the applicant has come to the employer's premises and logged on. A viewing system permits the employer to view applicant results from the electronic prediction system and the applicant's rank order, the applicant results providing information on applicants who have a high probability of performing successfully and not terminating early

BRIEF DESCRIPTION OF THE DRAWINGS

FIG. 6 shows an example of a web-based presentation for a screening solution.

FIG. 7 shows an example of a stack ranked table.

FIG. 8 shows an example of a screening solution question presented to an applicant taking a screening solution test over the Internet.

DETAILED DESCRIPTION OF THE DRAWINGS

A system for testing a job applicant provides a computerized stack ranking of multiple applicants, predictive of the comparative levels of successful job performance. The predictive stack ranking may be used as a dynamic interactive filter with a pool of applicants over the course of the evaluation or employment process. The system may utilize a communications network to communicate between an applicant terminal and a system server.

The system may be used for example for screening, selecting, retaining, assigning, or analyzing the job applicant. The job applicant can for example be a new job applicant, an employee seeking to retain a job, an employee seeking a different job in the same organization, or an employee being evaluated for retention, re-assignment, or promotion. Applicants may or may not know they are being evaluated.

Once an applicant becomes an employee, the system may collect data regarding the employee for use in a feedback loop informing the online hiring process and improving the accuracy of the predictive stack ranking. For example, the data may indicate the employer's rating of the employee's actual job performance. Such a rating can be cross-checked against the answers that the employee gave during the application process. The cross-checking can be used as feedback to refine the questions and evaluation criteria used at each stage of the hiring process. For example, the cross-checking may be analyzed to select from among many questions a small subset having high predictive value. The small subset can then be used in a quick initial screening stage. Or, the small subset can be given greater weight than other questions in a computerized stack ranking of candidates.

Figure 1:
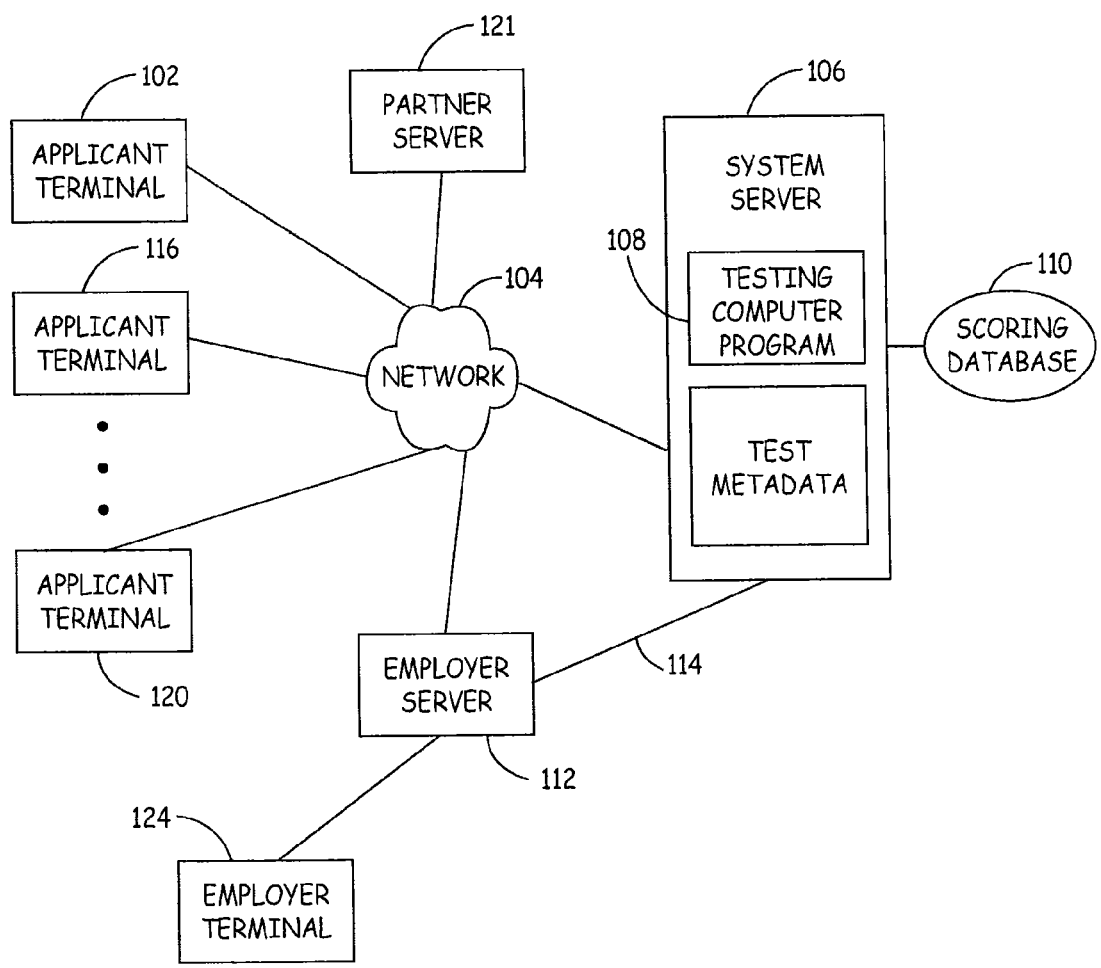
FIG. 1 provides a block diagram of an exemplary system in accordance with the present invention.

FIG. 1 provides a block diagram of an exemplary system in accordance with the present invention. A job applicant can use applicant terminal 102 to communicate over network 104 with system server 106. Applicant terminal 102 may for example be a telephone handset, a personal computer, a workstation, a handheld wireless device such as those marketed under the trademarks PALM or HANDSPRING, or a Wireless Application Protocol enabled device such as a mobile phone. Network 104 may for example be the Internet, the World Wide Web, a wide area network, a local area network, a telephone network, a wireless communication network, a combination thereof, or any other link capable of carrying communications between an applicant terminal and a server.

System server 106 employs a testing computer program 108 and has access to a scoring database 110. System server 106 communicates with applicant terminal 102 in accordance with instructions from testing computer program 108.

System server 106 may communicate with employer server 112 over network 104 or over direct link 114. System server 106 is shown as a unitary server, but may be a distributed computing platform.

An applicant terminal may be remote from, or co-located with, system server 106 and/or employer server 112. For example, applicant terminal 102 may be located at a job applicant's home, applicant terminal 116 may be located at a job fair or employment office, and applicant terminal 120 may be located at an employer's location.

Partner server 121 may be linked to network 104 and system server 106 to facilitate integration of a business partner seeking to participate in the system of FIG. 1.

System server 106 may pose questions to a job applicant located at an applicant terminal, receive responses from the job applicant, and score the answers in accordance with scoring database 110. The scoring may take place in real time, i.e., while the applicant is still online, and may be reported in the form of a comparative stack ranking of multiple applicants. The stack ranking may be delivered from system server 106, over either network 104 or direct link 114, to employer server 112.

Scoring of each answer by system server 106 may be instant, i.e., before the next question is answered. Thus, adaptive testing techniques may be implemented over network 104. For example, the answers given by an applicant at applicant terminal 102 to questions propounded early in a test may determine which questions are propounded by system server 106 to the applicant later in the same test. In addition, if an applicant at terminal 102 provides an unacceptable answer to a disqualifying "knock-out" question, server 106 may immediately terminate the test.

These same adaptive testing principles may be applied to a software program used to support a real time interview, either in person or over a communications network. For example, an employer conducting an oral interview in person or over a telephone can enter a candidate's oral answer into employer terminal 124, which then communicates the answer to system server 106, which in turn suggests via employer terminal 124 the next question for the employer to ask the interviewee.

The system may test an online applicant for any competency desired, in any sequence. The tested competencies may be abilities, traits, knowledge, skills, etc., that have been proven relevant to and predictive of successful job performance. By way of example and not limitation, the following competencies may be tested:

1. dependability
2. agreeableness
3. critical thinking
4. problem solving ability
5. talkativeness
6. assertiveness
7. gregariousness
8. persuasiveness
9. achievement
10. education
11. experience
12. customer service orientation
13. customer focus
14. conscientiousness
15. self-confidence
16. motivation
17. revenue focus
18. cognitive ability
19. leadership
20. decision making
21. flexibility
22. commitment
23. learning ability
24. dedication
25. tenacity
26. number of jobs held
27. length of time in job(s)
28. working with information
29. supervisory potential
30. judgment
31. leadership
32. coaching skills
33. teamwork
34. interpersonal skills
35. business leadership
36. leadership motivation
37. self-leadership
38. interpersonal leadership
39. communication skills
40. management potential
41. likelihood of retention
42. self-control
43. energy
44. executive potential
45. listening orientation
46. language skills (English, etc.)
47. verbal reasoning
48. spatial ability
49. interest
50. motivation Typically, system server 106 tests for certain ones of the competencies that have been proven to be predictive of successful performance of the type of job for which the applicant is being considered. The results of the testing are tabulated in a stack ranked table. The stack ranked table may rank a number of applicants against each other and list them in order, from first to last. The table may also present other information for each applicant. The other information may include, by way of example and not limitation:

1. Name
2. Identifying number (e.g. social security number).
3. Score achieved at various stages for various competencies.
4. Recommendation (or not) to continue the hiring process beyond each stage
5. Link to application information (e.g. address, resume details)
6. Contact information (phone number, e-mail address, mailing address, etc.)
7. Date of application
8. Success or failure in complying with knockout requirements for the job
9. Screening solution scores, presented as percentiles
10. A calculated recommendation to proceed or not to proceed with the applicant
11. Results (by competency) of the selection solution
12. Link to allow manual entry of the test answers if not done on computer directly by the applicant
13. A calculated recommendation to hire or not hire based on a weighted overall score of selection competencies (or other factors the hiring company wishes to use and that are approved as statistically valid and legally defensible)
14. Additional columns for storage of data from a structured behavioral interview
15. Additional columns for storage of data from other decision-making processes such as drug testing, reference checks, or medical exams.

Figure 2:
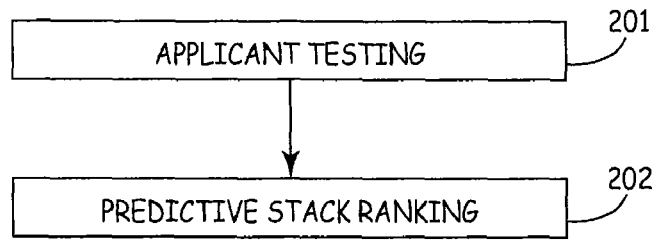
FIG. 2 illustrates a process for testing and evaluating job applicants in accordance with an embodiment of the present invention.

A process for testing and evaluating job applicants may be described with reference to FIG. 2. Generally, applicant testing 201 includes providing a test to a job applicant and scoring the applicant's answers. The test may be administered online or it may be administered manually off-line. Scores are entered into a system for calculating a stack ranked table. Predictive stack ranking 202 generally includes ranking a job applicant against other job applicants in order from first to last or other comparative ranking. The other job applicants may be current job applicants, past job applicants, or fictional job applicants.

Figure 3:
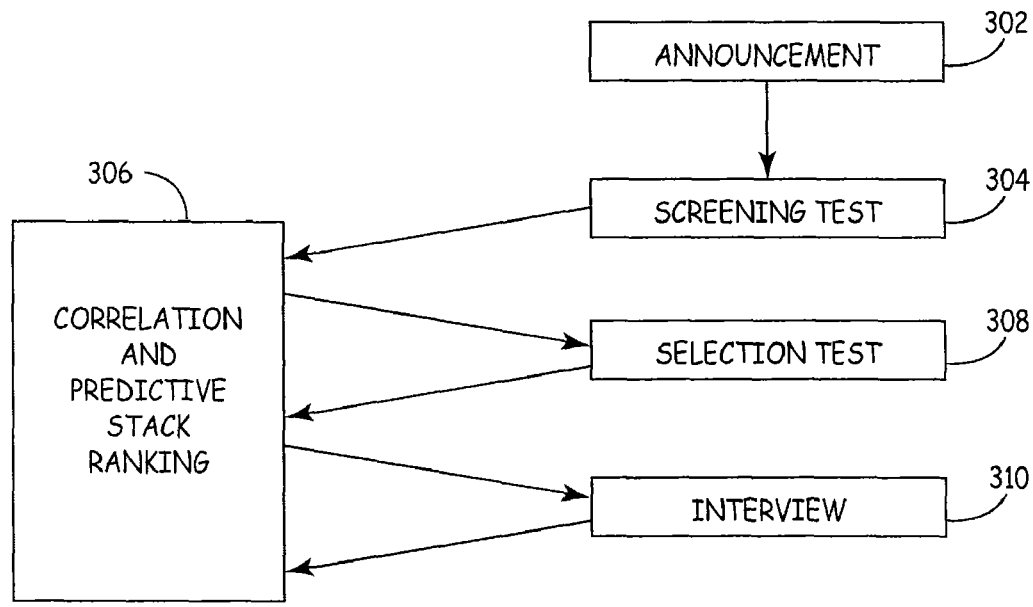
FIG. 3 depicts a hiring procedure in accordance with one embodiment of the invention.

FIG. 3 depicts a hiring procedure in accordance with one embodiment of the invention. Announcement 302 may be an online job announcement such as a web page with an "apply now" hyperlink icon. The web page may reside on an employer's website or an employment agency website, for example. Or, an online job announcement may be a recorded announcement on a menu-driven telephone voice processing system. Alternatively, announcement 302 may be an offline job announcement such as a newspaper advertisement.

In response to announcement 302, an interested job applicant requests administration of screening test 304. Screening test 304 may be remotely administered and scored online, i.e., unproctored, with the scores being automatically provided to correlation and predictive stack ranking 306. Alternatively, screening test 304 may be administered manually with paper and pencil, and then graded by hand or machine, with the scores being provided to correlation and predictive stack ranking 306. The predictive stack ranking may for example be constructed by system server 106 or employer server 112.

Correlation and predictive stack ranking 306 totals the graded answers according to particular competencies known to be relevant to successful job performance. In a preferred embodiment, the questions to be asked at the various stages are selected for a particular type of job being offered in accordance with a proven relationship with desired business outcomes. Business outcomes can for example include: level of sales, customer satisfaction, quality measures such as fault rates, retention and tenure of employment, time keeping, learning ability, progression to more senior roles over time, and supervisor ratings of behavioral success. The particular type of job is defined in conjunction with the U.S. Department of Labor "O*NET" classification system. Some types of jobs might include customer service, technical, professional, or managerial. Various competencies are determined to be associated with desired business outcomes for a given type of job. These competencies are tested for at various solution stages with appropriate questions.

The appropriate competencies, questions, scoring, weighting, and ranking factors for a new job can be designed from historical tests for existing jobs, by applying statistical techniques and using the gathering of data on the Internet to ensure rapid validation of the new assessment solution. Confirmatory job analysis is used to determine the appropriateness of solutions for a particular job.

Correlation and predictive stack ranking 306 may be administered by a computer processor located at system server 106, for example. Predictive stack ranking 306 may give different weight to different questions, and may at any stage immediately disqualify an applicant providing an unacceptable answer to a "knock-out" question. Correlation and predictive stack ranking 306 may rank the applicant in order against other job applicants in a table. Correlation and predictive stack ranking 306 may be used to decide which applicants to invite for the next stage, selection test 308.

Selection test 308 is preferably conducted under supervised conditions, i.e., proctored. For example, selection test 308 may be administered in person. An in-person test may take place at a job fair, an employer's location, a job site, or an employment agency. An in-person test may include verification of the job applicant's identity, such as by examination of a photo identification document produced by a test-taker. Selection test 308 may be administered online or manually. Supervised conditions typically include observation of the test-taker during administration of the test. The answers to selection test 308 are graded and the results are incorporated in correlation and stack ranking 306.

Correlation and predictive stack ranking 306 may then update a previously created entry for the applicant and rank or re-rank the applicant in order against other job applicants. After this is accomplished, the highest ranking applicants may be invited for interview 310.

Interview 310 may be structured or unstructured, online or in person. If interview 310 is structured, a program leads the interviewer through the interview by suggesting questions one at a time. The program may be a list of questions written on paper or it may be a computer program resident for example in system server 106. The program suggests questions that are predetermined to be valid, i.e., proven to be associated with successful job performance and legally permitted. The interviewer can input the answers and/or a score for the answers, either after each answer or at the conclusion of the interview. This can be done via employer terminal 124, for example.

Interview 310 results in an interview score being provided to predictive stack ranking 306. Correlation and predictive stack ranking 306 is revised to reflect the interview score. In particular, the relative rank of the job applicants is reassessed.

Figure 4:
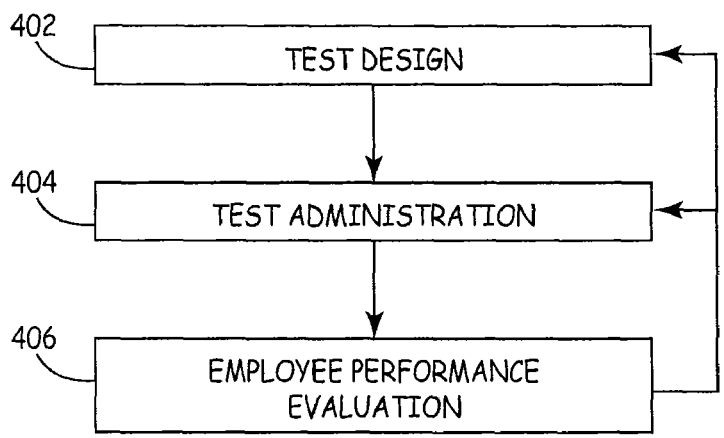
FIG. 4 is a block diagram of a process employing feedback.

FIG. 4 is a block diagram of a process employing feedback. Test design 402 is initially performed using industry-accepted standards. Test administration 404 tests and scores job applicants and/or incumbents. Employee performance evaluation 406 measures actual job performance of the applicant or incumbent after holding the job for a period of time. This information is fed back to test design 402 and/or test administration 404. Test design 402 may be revised to delete questions which were not predictive of successful job performance. This can be done for example by deleting questions whose answers bore no relation to performance evaluation 406 for a statistically valid sample. Test administration 404 may be revised by adjusting the weight given to certain questions or answers that showed an especially strong correlation to employee performance evaluation 406. For example, if test administration 404 is associated with correlation and predictive stack ranking 306, feedback from employee performance evaluation 406 may help determine how various job applicants are comparatively ranked against each other.

Figure 5:
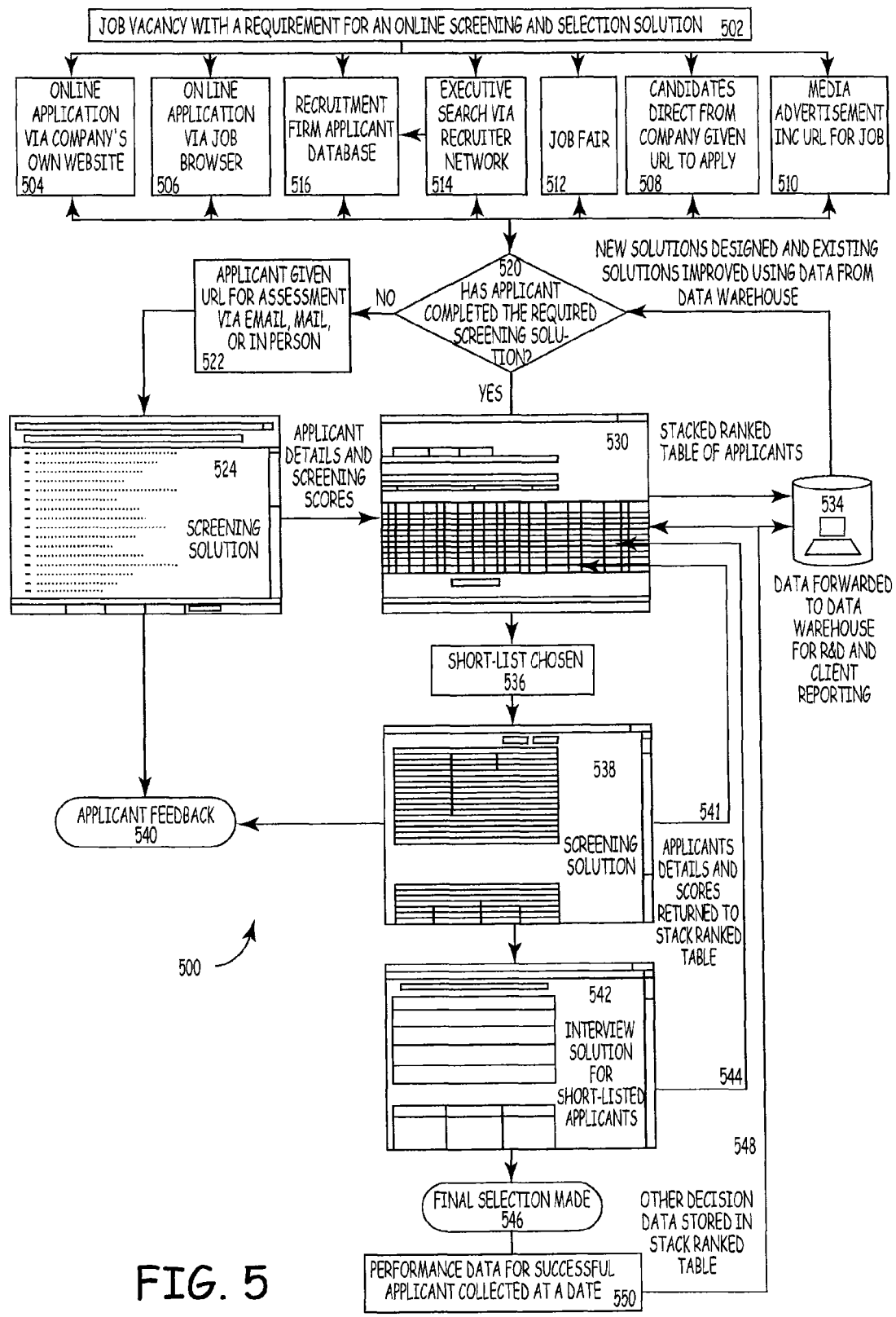
FIG. 5 diagrams an online system in accordance with one embodiment of the invention.

FIG. 5 diagrams an online computer based system 500 in accordance with one embodiment of the invention. Box 502 represents a job vacancy with a requirement for an online screening and selection solution. The vacancy can come to the attention of a potential job applicant in a number of ways.

For example, box 504 represents an online application via a hiring company's own website. A company offering a job may post a vacancy announcement on the company's website and invite job seekers to apply by clicking on an icon labeled "apply here" or the like. Box 506 represents a similar posting on an online job board. Box 508 represents candidates given a Uniform Resource Locator (URL) directly by the company. This may occur when the company offering a job identifies a potential candidate. Box 510 represents a media advertisement including a URL for a job. Thus, job seekers observing the advertisement can direct their browsers to the indicated URL.

At job fair 512, job seekers may be provided a URL associated with the company or the particular vacancy. Paper-and-pencil measures could also be used at job fairs and entered into the system. A computer terminal may be provided for use of job seekers at job fair 512, enabling job seekers to participate in the online system. Box 514 represents an executive search via a recruiter network. Job seekers relevant to the search are identified in recruitment firm applicant database 516. Database 516 can link to a URL associated with the job.

Preferably, no matter how a potential applicant becomes aware of or identified for a job opening in system 500, the potential applicant is considered at decision 520. Decision 520 asks whether applicant has completed the required screening solution 524. If not, the applicant at box 522 is given via e-mail, mail, or in person, a URL for assessment. For example, system 500 may send an e-mail message to a potential applicant, the e-mail message inviting the potential applicant to apply for vacancy 502 by directing a browser to a screening solution URL provided in the e-mail message. Alternatively, when a potential applicant is visiting a website at which decision 520 determines that the required screening solution has not been completed, the website host can provide a link to a web page identified by the screening solution URL. Decision 520 may be based on a potential applicant's name, e-mail address, and/or other identifying information.

Screening solution 524 is administered via the Internet and is hosted at the screening solution URL mentioned above. Screening solution 524 asks screening questions to ascertain if the applicant has the basic qualifications to do the job. These are based on questions typically asked by recruiters but which are statistically validated over time to ensure they are legally defensible and predictive. The questions may include a combination of biodata and personality measures. They may include self-assessments of skill levels appropriate to the job requirements. Screening solution 524 requires applicants to transmit elicited information over the Internet. A possible example of a web-based presentation for screening solution 524 is illustrated in FIG. 6. Screen shot 600 shows a portion of the presentation.

Once completed, screening solution 524 provides applicant feedback 540 and conveys applicant details and screening scores to stack ranked table of applicants 530. Applicant feedback 540 may provide a message to the online applicant indicating that the screening solution is complete, that the applicant has passed or failed the screening stage, and that the applicant may or may not be contacted in due course. Other information may also be provided to the applicant in the feedback pages, like a realistic job preview, recruiter phone number, scheduling information, etc.

Once an applicant has completed the screening solution, system 500 ranks the applicant in comparative order against other applicants in stack ranked table of applicants 530. A certain number or percentage of applicants in table 530 will be chosen for further consideration. For example, the applicants ranking among the top five of all applicants ranked in table 530 may be chosen for advancement in the system at this juncture. Information identifying the chosen applicants will be included on a "short list" as indicated by box 536.

The short list chosen at box 536 is transmitted to selection solution 538, at which the advancing applicants are invited to answer selection questions. Selection solution 538 asks additional questions and requires an advancing applicant to input answers. Preferably, the applicant completes selection solution 538 while sitting at a terminal located at one of the company's locations. The terminal communicates over the Internet with a website set up to administer the selection solution.

At the conclusion of selection solution 538, applicant feedback 540 is provided from the website to the applicant, and applicant details and scores 541 are incorporated in stack ranked table 530. Feedback 540 may optionally include a sophisticated report on the applicant's strengths and weakness. The applicant may then be directed to an appropriate web page chosen by the hiring company. One page may indicated successful completion and a second page may indicate failure. The appropriate web page may suggest other openings appropriate to the applicant's test responses and may provide hyperlinks the applicant can use to initiate the application process for these other openings.

Once stack ranked table 530 re-ranks the applicants as a result of selection solution 538, some applicants are invited to participate in interview solution 542. For example, the top three applicants as ranked by table 530 after selection solution 538 may be invited for an in-person interview. Because the selection solution is preferably in instant communication with stack ranked table 530, the interview invitation may be extended immediately at the conclusion of the selection solution.

Interview solution 542 is preferably a structured interview, with questions provided via the Internet to the interviewer at the company's location. The interviewer reads the provided questions and reports a score over the Internet from the company's location for incorporation in stack ranked table 530. Benchmark performance anchors may assist the interviewer in grading the applicant's responses.

Interview solution 542 can be designed according two exemplary models. In a first model, an employer is provided with standard interview guides for several job types as well as the competency templates for these types so that the employer can build variations to meet specific needs. In a second model, an employer can build new interview guides and new competency templates. In the second model, the employer has access to the full array of work-related competencies and associated questions in a comprehensive question bank.

In ranking applicants, stack ranked table 530 may consider a combination of different biographical, personality, behavioral, and other appropriate information and competencies. In addition to the comparative ranking, table 530 may indicate for each applicant a yes/no recommendation, a percentage likelihood of successful job performance, biographical information not used for evaluative purposes, and so forth.

Stack ranked table 530 may be developed by grading the various solution stages with a computer implementing the following algorithm. First, search for disqualifying answers to "knock-out" questions. Second, give points for answers matching those of the previously hired candidates who achieved a successful performance evaluation. Third, deduct points for answers matching those of the previously hired candidates who received an unsuccessful performance rating. Fourth, multiply the added or subtracted points by any weighting assigned each question. Fifth, sum the points for all questions related to a given competency. Sixth, compare the summed points for each competency to norms of either the job-holders in the company or a wider population. Seventh, predict performance of the applicant as a worker in the job, based on the business outcomes identified by the hiring company and the competencies that contribute to those outcomes.

A final selection 546 is made based on stack ranked table 530. Preferably, the selection is transmitted over the Internet to the company, enabling the company to make an offer to the selected applicant(s). For example, if there is only one opening, an offer may be extended to the applicant ranked highest by stack ranked table 530. If the applicant accepts the offer, the applicant is employed by the company. If the applicant declines, the next highest ranked applicant in stack ranked table 530 is offered the job. If a plural number of openings exist, that number of applicants may be selected off the top of stack ranked table 530 and offered the job. If one of the applicants declines, the next highest ranked applicant in stack ranked table 530 is offered the job. Data from stack ranked table 530 is forwarded to data warehouse 534.

The performance of successful applicants is monitored during their employment. At box 550, performance data for successful applicants are collected at a later date, and sent 548 to data warehouse 534.

Data collected at data warehouse 534 are used for research and development and for reporting purposes. For example, functions enabled by storing comprehensive data generated by system 500 may include:

a. Storage of question level responses from applicants for jobs. This can be used for re-checking of applicant information (auditing etc.) and for research to develop new solutions and questions.

b. Reporting on Equal Employment Opportunity Commission requirements. Data on ethnicity etc. can be stored to enable an employer to comply with reporting requirements to government agencies.

c. Source of data for designing new solutions including data on the nature of the job and the competencies that are required by the role (job analysis). This data is collected using online assessments.

d. Source of data for statistical research on correlation between the solutions and their predicted outcomes for applicants, and the actual outcomes for employees who were hired (validation studies).

e. Design of solutions other than recruitment related solutions.

f. Reporting of usage volumes for billing and financing accounting purposes.

Because system 500 preferably uses instant communications, adaptive testing techniques may be implemented online. An applicant's failure to overcome hurdles in a given solution will deliver a different path through the solution than that of a successful applicant. The degree of advancement of a given applicant through system 500 may result in different charges to the company from a solutions provider. For example, a solutions provider that hosts a website supporting screening solution 524, selection solution 538, and interview solution 542 may charge the hiring company the following amounts: one dollar for every applicant completing only the screening solution, five dollars for every applicant advancing only to the end of the selection solution, ten dollars for every applicant rejected after the interview solution, twenty dollars for every applicant offered a job, and fifty dollars for every applicant accepting an offer.

In practice, any of the various stages (screening solution 524, selection solution 538, and interview solution 542) may be skipped, re-ordered, combined with other stages, or eliminated. Or, a short telephone interview may be structured early in the process to quickly screen applicants.

FIG. 7 shows an example of a stack ranked table. Computer screen shot 700 illustrates a sample stack ranked table 730 for a customer service job. Various tabs permit viewing of data generated by each solution stage. Tab 702 reveals data 703 from a screening solution, tab 704 reveals data 705 from a selection solution, tab 706 reveals data 707 from an interview solution, and tab 708 reveals all results. In screen shot 700, tab 708 is selected.

Section 709 of screen shot 700 shows general information about each applicant, including current rank 710, a link 712 to application information (not shown), last name 714, first name 716, and application date 718.

Screening solution data 703 includes an indication 720 of whether each applicant successfully passed the knockout requirements for the job. Data 703 also includes scores on certain competencies such as educational and work related experience 722, customer service orientation 724, and self-confidence 726. Column 728 indicates whether each applicant is recommended to advance beyond the screening stage.

Selection solution data 705 includes scores on certain competencies such as customer focus 732, conscientiousness 734, and problem solving 736. Column 738 indicates whether each applicant is recommended to advance beyond the selection stage. Column 740 includes a detailed report for each applicant, while column 750 includes a score.

Additional information (not shown) may include columns for storage of data from other decision-making processes such as drug testing, reference checks, or medical exams.

FIG. 8 shows an example of a screening solution question presented to an applicant taking a screening solution test over the Internet. In screen shot 800, simulated customer contact record 802 is presented to the applicant. The applicant is asked question 804, and is required to click on a circle next to one of the answers. Question 804 may test for a competency in working with information, for example.

Figure 9:
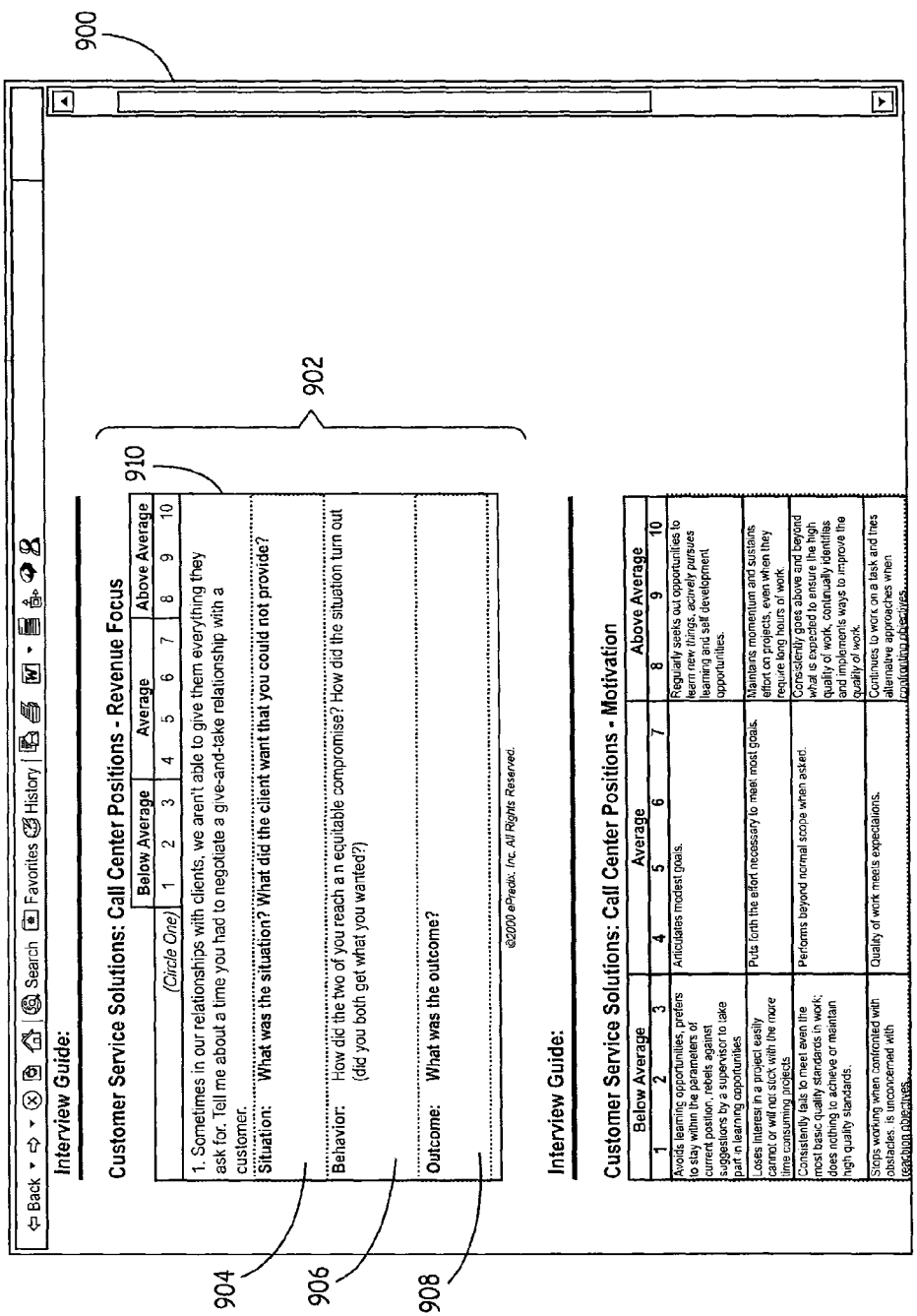
FIG. 9 shows an example of a structured interview guide for use in an interview solution.

FIG. 9 shows an example of a structured interview guide for use in an interview solution. As illustrated, the interview guide is being presented online on a computer screen to an interviewer conducting an interview with an applicant. Screen shot 900 shows interview item 902 for a sample customer service job. The customer service job opening is for a call center position, and revenue focus has been identified as a relevant and predictive competency. Item 902 elicits from the applicant a situation 904, the applicant's behavior 906 in the situation, and the outcome 908 reported by the applicant.

The interviewer can grade the applicant's responses to item 902 by marking a score 910 from 1 to 10.

Figure 10:
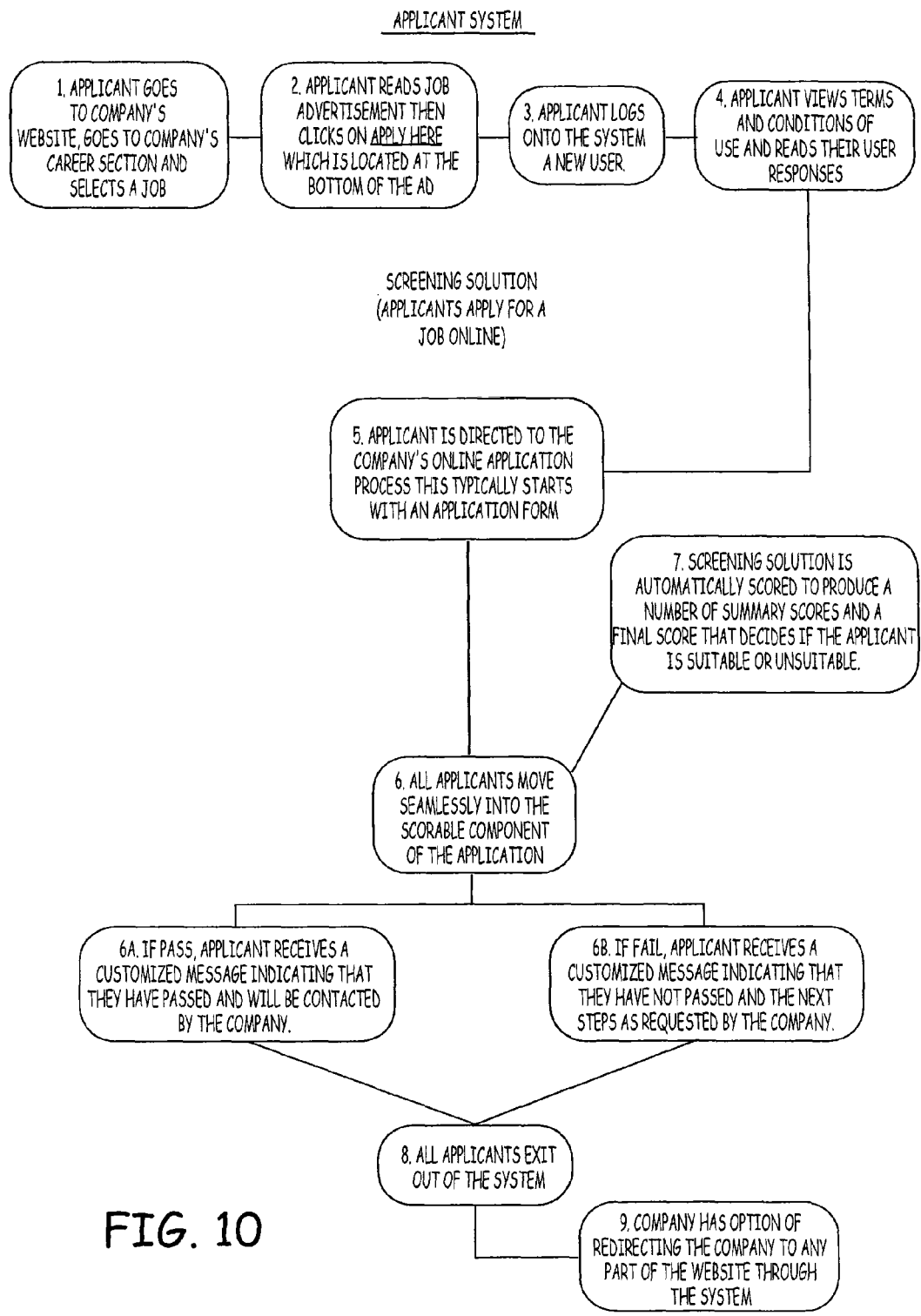
FIG. 10 illustrates procedural steps that may be followed in a web-based applicant system according to an embodiment of the present invention.

FIG. 10 illustrates procedural steps that may be followed in a web-based applicant system according to an embodiment of the present invention.

Figure 11:
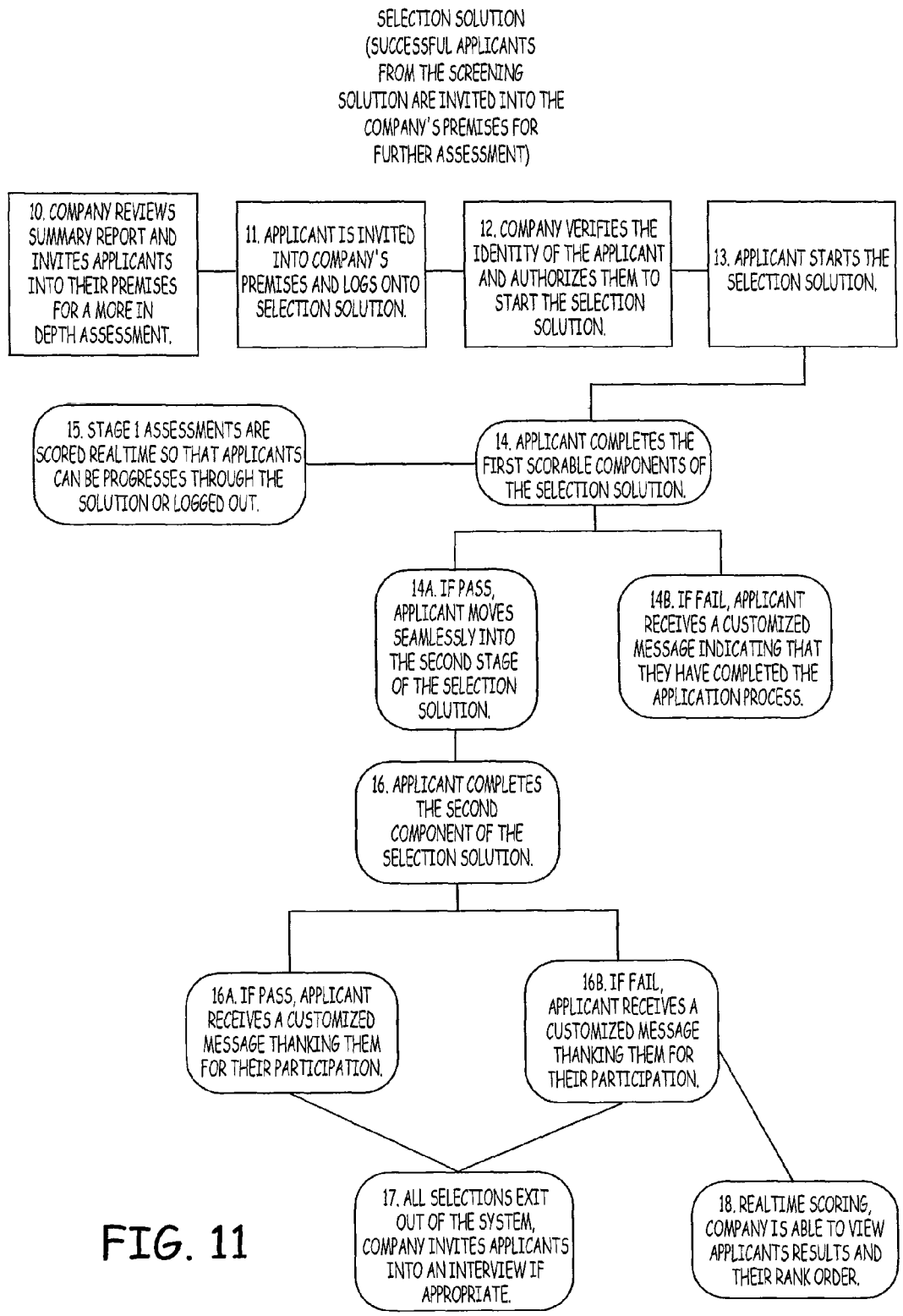
FIG. 11 illustrates procedural steps that may be followed in a web-based selection

FIG. 11 illustrates procedural steps that may be followed in a web-based selection solution according to an embodiment of the present invention. For example, these steps may follow those illustrated in FIG. 10.

Figure 12:
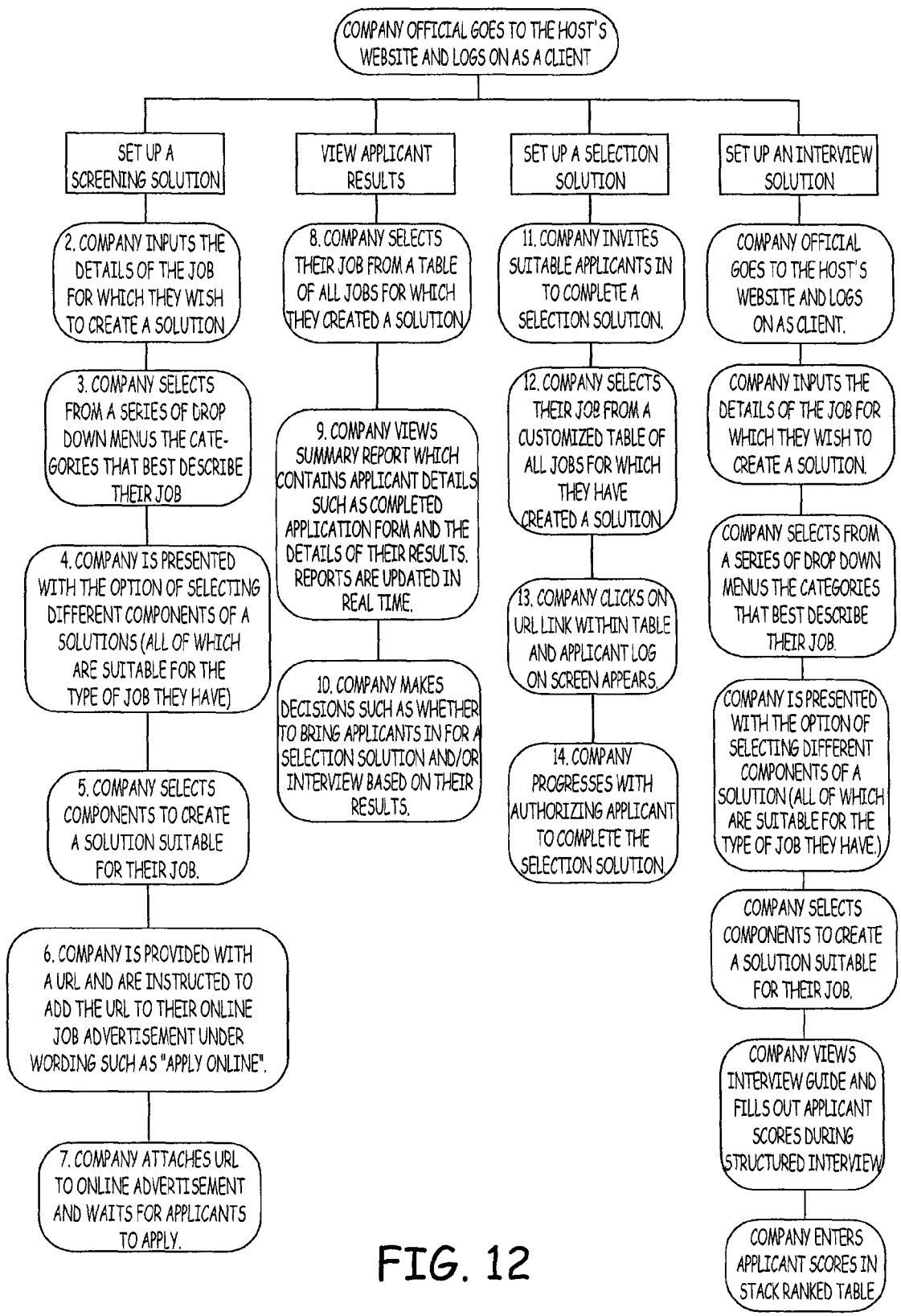
FIG. 12 illustrates procedural steps that may be followed by an employer according to an embodiment of the present invention.

FIG. 12 illustrates procedural steps that may be followed by an employer according to an embodiment of the present invention.

The following tables provide examples of screening solutions and selection solutions designed for different types of jobs. The tables show components (competencies) shown to be relevant to successful performance of each job type. In the tables, some components are considered required, and others are considered optional.

TABLE 1

Table One: Entry/General Skilled Solutions

| | Solution Component | Definition | Items |
|---|---|---|---|
| | | Screening 7-10 Minutes | |
| Required | Educational and Work-Related Experience | Measures potential for success in entry-level jobs across industry type and functional area. Scores on Education and Work-Related Experience are derived from candidates' responses to questions regarding developmental influences, self-esteem, work history and work-related values and attitudes. | 15 |
| | Self-Confidence | This component references: belief in one's own abilities and skills and a tendency to feel competent in several areas. | 7 |
| Optional | Decision Making/Flexibility | Measures potential for success in entry level positions. Scores on Decision Making and Flexibility are derived from candidates' responses to questions regarding developmental influences, self-esteem, work history and work-related values and attitudes. | 8 |
| | | Screening 23-35 Minutes | |
| Required | Conscientiousness | This component is designed to predict the likelihood that candidates will follow company policies exactly, work in an organized manner, return from meals and breaks in the allotted time, and keep working, even when coworkers are not working. | 65 |
| | Retention Predictor | Measures commitment, impulsiveness, responsibility, and motivation. It predicts the likelihood that new hire will remain on the job for at least three months. | 44 |
| Optional | Leaning Ability | This component measures the tendency to efficiently and effectively use numerical and analytical reasoning. | 54 (12 minute timer) |

TABLE 1-continued

Table One: Entry/General Skilled Solutions

| Solution Component | Definition | Items |
|---|---|---|
| | This competency is characterized by the ability to learn work-related tasks, processes, and policies. | |

TABLE 2

Table Two - Customer Service Solution

| | Solution Component | Definition | Items |
|---|---|---|---|
| | | Screening 8-10 Minutes | |
| Required | Educational and Work-Related Experience | Measures potential for success in customer service jobs. Scores on Education and Work-Related Experience are derived from candidates responses to questions regarding developmental influences, self-esteem, work history and work-related values and attitudes. | 15 |
| | Customer Service Orientation | Designed to predict the likelihood that candidates will show persistent enthusiasm in customer interaction, apologize sincerely for inconveniences to customers, be patient with customers, tolerate rude customers calmly, and search for information or products for customers. | 20 |
| Optional | Self-Confidence | This component references; belief in one's own abilities and skills and a tendency to feel competent in several areas. | 7 |
| | | Screening 17-29-27 Minutes | |
| Required | Customer Focus | Designed to predict the likelihood that candidates will show persistent enthusiasm in customer interaction, apologize incerely for inconveniences to customers, be patient with customers, tolerate rude customers calmly, and search for information or products for customers. | 32 |
| | Conscientiousness | This component is designed to predict the likelihood that candidates will follow company policies exactly, work in an organized manner, return from meals and breaks in the allotted time, and keep working, even when coworkers are not working. | 65 |
| Optional | Learning Ability | This component measures the tendency to efficiently and effectively use numerical and analytical reasoning. This competency is characterized by the ability to learn work-related tasks, processes, and policies. | 54 (12 minute timer) |
| Optional | Retention Predictor | Measures commitment, impulsiveness, responsibility, | 44 |

TABLE 2-continued

Table Two - Customer Service Solution

| | Solution Component | Definition | Items |
|---|---|---|---|
| | | and motivation. It predicts the likelihood that a new hire will remain on the job for at least three months | |

TABLE 3

Table Three - Customer Service Solution: Sales Positions

| | Solution Component | Definition | Items |
|---|---|---|---|
| | | Screening 9-15 Minutes | |
| Required | Educational and Work-Related Experience | Measures potential for success in customer service jobs. Scores on Education and Work-Related Experience are derived from candidates responses to questions regarding developmental influences, self-esteem, work history and work-related values and attitudes. | 15 |
| | Customer Service Orientation | This component is designed to predict the likelihood that candidates will show persistent enthusiasm in customer interaction, apologize sincerely for inconveniences to customers, be patient with customers, tolerate rude customers calmly, and search for information or products for customers. | 20 |
| Optional | Sales Potential | Designed to predict the likelihood that candidates will suggest or show alternative solutions based on customer needs, direct conversation toward a commitment/order/sale, show confidence even after a hard refusal/rejection, and strive to close a transaction every time. | 23 |
| | | Screening 15-27 Minutes | |
| Required | Sales Potential | Designed to predict the likelihood that candidates will suggest or show alternative solutions based on customer needs, direct conversation toward a commitment/order/sale, show confidence even after a hard refusal/rejection, and strive to close a transaction every time. | 60 |
| | Customer Focus | Designed to predict the likelihood that candidates will show persistent enthusiasm in customer interaction, apologize sincerely inconveniences to customers, be patient with customers, tolerate rude customers calmly, and search for information or products for customers. | 32 |
| Optional | Learning Ability | This component measures the tendency to efficiently and effectively use numerical and analytical reasoning. This competency is characterized by the ability to learn work-related tasks, processes, and policies. | 54 (12 minute timer) |

TABLE 4

Table Four - Customer Service Solution: Call Center Positions

| | Solution Component | Definition | Items |
|---|---|---|---|
| | | Screening 9-11 minutes | |
| Required | Educational and Work-Related Experience | Measures potential for success in customer service jobs. Scores on Education and Work-Related Experience are derived from candidates responses to questions regarding developmental influences, self-esteem, work history and work-related values and attitudes. | 15 |
| | Customer Service Orientation | Designed to predict the likelihood that candidates will show persistent enthusiasm in customer interaction, apologize sincerely for inconveniences to customers, be patient with customers, tolerate rude customers calmly, and search for information or products for customers. | 20 |
| Optional | Self-Confidence | This component references: belief in one's own abilities and skills and a tendency to feel competent in several areas. | 7 |
| | | Screening 16-31-39 Minutes | |
| Required | Customer Focus | This component is designed to predict the likelihood that candidates will show persistent enthusiasm in customer interaction, apologize sincerely for inconveniences to customers, be patient with customers, tolerate rude customers calmly, and search for information or products for customers. | 32 |
| | Conscientiousness | This component is designed to predict the likelihood that candidates will follow company policies exactly, work in an organized manner, return from meals and breaks in the allotted time, and keep working, even when coworkers are not working. | 65 |
| | Working with information | This component is designed to predict success in customer service call-center jobs by assessing a candidate's ability to retrieve information and use it in order to solve problems. | 30 (15 minutes timer) |

TABLE 4-continued

Table Four - Customer Service Solution: Call Center Positions

| | Solution Component | Definition | Items |
|---|---|---|---|
| Optional | Retention Predictor | Measures commitment, impulsiveness, responsibility, and motivation. It predicts the likelihood that a new hire will remain on the job for at least three months. | 44 |

TABLE 5

Table Five - Customer Service Solution: Call Center Sales Positions

| | Solution Component | Definition | Items |
|---|---|---|---|
| | | Screening 9-15 Minutes | |
| Required | Educational and Work-Related Experience | Measures potential for success in customer service jobs. Scores on Education and Work-Related Experience are derived from candidates' responses to questions regarding developmental influences, self-esteem, work history and work-related values and attitudes. | 15 |
| | Customer Service Orientation | Designed to predict the likelihood that candidates will show persistent enthusiasm in customer interaction, apologize sincerely for inconveniences to customers, be patient with customers, tolerate rude customers calmly, and search for information or products for customers. | 20 |
| Optional | Sales Potential | Designed to predict the likelihood that candidates will suggest or show alternative solutions based on customer needs, direct conversation toward a commitment/order/sale, show confidence even after a hard refusal/rejection, and strive to close a transaction every time. | 23 |
| | | Screening 30 Minutes | |
| Required | Sales Focus | Designed to predict the likelihood that candidates will suggest or show alternative solutions based on customer needs, direct conversation toward a commitment/order/sale, show confidence even after a hard refusal/rejection, and strive to close a transaction every time. | 60 |
| | Customer Focus | Designed to predict the likelihood that candidates will show persistent enthusiasm in customer interaction, apologize sincerely for inconveniences to customers, be patient with customers, tolerate rude customers calmly, and search for information or products for customers. | 32 |
| | Working with | This component is designed | 30 |

TABLE 5-continued

Table Five - Customer Service Solution: Call Center Sales Positions

| | Solution Component | Definition | Items |
|---|---|---|---|
| | Information | to predict success in customer service call-center jobs by assessing a candidate's ability to retrieve information and use it in order to solve problems. | (15 minute timer) |

TABLE 6

Table Six - Sales Solutions

| | Solution Component | Definition | Items |
|---|---|---|---|
| | | Screening 10-14 Minutes | |
| Required | Educational and Work-Related Experience | Measures potential for success in customer service jobs. Scores on Education and Work-Related Experience are derived from candidates responses to questions regarding development influences, self-esteem, work history and work-related values and attitudes. | 15 |
| | Sales Potential | Designed to predict the likelihood that candidates will suggest or show alternative solutions based on customer needs, direct conversation toward a commitment/order/sale, show confidence even after a hard refusal/rejection, and strive to close a transaction every time. | 23 |
| Optional | Customer Service Orientation | Designed to predict the likelihood that candidates will show persistent enthusiasm in customer interaction, apologize sincerely for inconveniences to customers, be patient with customers, tolerate rude customers calmly, and search for information or products for customers. | 20 |
| | | Screening 10-25-40 Minutes | |
| Required | Sales Focus | Designed to predict the likelihood that candidates will suggest or show alternative solutions based on customer needs, direct conversation toward a commitment/order/sale, show confidence even after a hard refusal/rejection, and strive to close a transaction every time. | 60 |
| Optional | Problem Solving | Measures the tendency to efficiently and effectively use numerical and analytical reasoning. This competency is characterized by the ability to solve complex problems, and make reasoned decisions. | 10 |
| Optional | Communication | Measures the tendency to efficiently and effectively use verbal reasoning. This competency is characterized | 10 |

TABLE 6-continued

Table Six - Sales Solutions

| | Solution Component | Definition | Items |
|---|---|---|---|
| | | by the ability to verbally explain complex information to others. | |

TABLE 7

Table Seven - Supervisory Solutions

| | Solution Component | Definition | Items |
|---|---|---|---|
| | Screening 10-20 Minutes | | |
| Required | Supervisory Potential | Measures potential for supervisory success across industry type and functional area. Scores on Supervisory Potential are derived from candidates' responses to questions regarding academic and social background, and aspirations concerning work. | 10 |
| | Judgment | Measures potential for making good judgments about how to effectively respond to work situations. Scores on Judgment are derived from candidates' responses to questions regarding situations one would likely encounter as a manager/supervisor. | 10 |
| Optional | Leadership/Coaching Teamwork/ Interpersonal Skills | Measures potential for success as a supervisor. This is done by having applicants' make judgments about the most effective teamwork and leadership behaviors in specific work situations. Scores are determined by comparing their response profiles to the profiles of supervisors who are known to be successful. | 19 |
| | Screening 22-37-52 Mins | | |
| Required | Business Leadership | Measures the candidate's thinking styles. High scorers are likely to have or learn good planning and organizing skills, be innovative, consider issues from multiple perspectives, and create strategies to build their business. | 28 |
| Required | Leadership Motivation | Measures the candidate's desire for achievement, drive, initiative, energy level, willingness to take charge, and persistence. High scorers are likely to be highly motivated to succeed and to set challenging goals for themselves and others. | 23 |
| | Self-Leadership | Measures the candidate's ability to control emotions, act with integrity, take responsibility for actions, and tolerate stress. High scorers are also likely to have a positive attitude, be | 32 |

TABLE 7-continued

Table Seven - Supervisory Solutions

| | Solution Component | Definition | Items |
|---|---|---|---|
| | | optimistic about the future, and demonstrate high levels of professionalism. | |
| | Interpersonal Leadership | Measures the candidate's interpersonal characteristics. High scorers are likely to persuade and influence others, gain commitment, and build effective interpersonal relationships. They also have potential to develop skills in the area of employee relations, coaching, motivating, and leading a team. | 30 |
| Optional | Decision Making/Problem Solving | Measures the tendency to efficiently and effectively use numerical and analytical reasoning. This competency is characterized by the ability to solve complex problems, and make reasoned decisions. | 10 |
| Optional | Communication | Measures the tendency to efficiently and effectively use verbal reasoning. This competency is characterized by the ability to verbally explain complex information to others. | 10 |

TABLE 8

Table Eight - Professional Solutions

| | Solution Component | Definition | Items |
|---|---|---|---|
| | Screening 7 - Minutes | | |
| Required | Dependability | This competency is characterized to behave in expected and agree upon ways; following through on assignments and commitments; keep promises; and accept the consequences of one's own actions. | 40 |
| | Interpersonal Skills | This competency is indexed by a tendency to be pleasant, cooperative, and helpful when working with others, as well as flexible in conflict resolution situations. | |
| | Self-Control | This competency is characterized by the ability to: stay calm and collected when confronted with adversity, frustration, or other difficult situations; and avoid defensive reactions or hurt feelings as a result of others' comments. | |
| | Energy | This competency is characterized by a preference to stay busy, active, and avoid inactive events or situations. | |
| | Selection 35-50 Minutes | | |
| Required | Business Leadership | Measures the candidate's thinking styles. High scorers | 32 |

TABLE 8-continued

Table Eight - Professional Solutions

| | Solution Component | Definition | Items |
|---|---|---|---|
| | | are likely to have or learn good planning and organizing skills, be innovative, consider issues from multiple perspectives, and create strategies to build their business. | |
| | Leadership Motivation | Measures the candidate's desire for achievement, drive, initiative, energy level, willingness to take charge, and persistence. High scorers are likely to be highly motivated to succeed and to set challenging goals for themselves and others. | 35 |
| | Self-Leadership | Measures the candidate's ability to control emotions, act with integrity, take responsibility for actions, and tolerate stress. High scorers are also likely to have a positive attitude, be optimistic about the future, and demonstrate high levels of professionalism. | 34 |
| | Interpersonal Leadership | Measures the candidate's interpersonal characteristics. High scorers are likely to persuade and influence others, gain commitment, and build effective interpersonal relationships. They also have potential to develop skills in the areas of employee relations, coaching, motivating, and leading a team. | 41 |
| | Decision Making/Problem Solving | Measures the tendency to efficiently and effectively use numerical and analytical reasoning. This competency is characterized by the ability to solve complex problems, and make reasoned decisions. | 10 |
| Optional | Communication | Measures the tendency to efficiently and effectively use verbal reasoning. This competency is characterized by the ability to verbally explain complex information to others. | 10 |

TABLE 9

Table Nine - Managerial Solutions

| | Solution Component | Definition | Items |
|---|---|---|---|
| Screening 10-20 Minutes | | | |
| Required | Management Potential | Measures potential for managerial success across industry type and functional area. Scores on Management Potential are derived from candidates' responses to questions regarding academic and social background, and aspirations concerning work. | 10 |
| | Judgment | Measures potential for making good judgments about how to effectively respond to work situations. Scores on Judgment are derived from candidates' responses to questions regarding situations one would likely encounter as a manager/supervisor. | 10 |
| Optional | Self-Confidence | This component references: belief in one's own abilities and skills and a tendency to feel competent in several areas. | 10 |
| | Decision Making | Measures potential for success as a manager. This is done by having applicants' make judgments about the most effective decisions in specific work situations. Their potential is determined by comparing their response profiles to the profiles of successful managers. | |
| Selection 20-35-50 Mins | | | |
| Required | Business Leadership | Measures the candidate's thinking styles. High scorers are likely to have or learn good planning and organizing skills, be innovative, consider issues from multiple perspectives, and create strategies to build their business. | 32 |
| | Leadership Motivation | Measures the candidate's desire for achievement, drive, initiative, energy level, willingness to take charge, and persistence. High scorers are likely to be highly motivated to succeed and to set challenging goals for themselves and others. | 35 |
| | Self-Leadership | Measures the candidate's ability to control emotions, act with integrity, take responsibility for actions, and tolerate stress. High scorers are also likely to have a positive attitude, be optimistic about the future, and demonstrate high levels of professionalism. | 34 |
| | Interpersonal Leadership | Measures the candidate's interpersonal characteristics. High scorers are likely to persuade and influence others, gain commitment, and build effective interpersonal relationships. They also have potential to develop skills in the areas of employee relations, coaching, motivating, and leading a team. | 41 |
| Optional | Decision Making/Problem Solving | Measures the tendency to efficiently and effectively use numerical and analytical reasoning. This competency is characterized by the ability to solve complex problems, and make reasoned decisions. | 10 |
| Optional | Communication | Measures the tendency to | 10 |

TABLE 9-continued

Table Nine - Managerial Solutions

| | Solution Component | Definition | Items |
|---|---|---|---|
| | | efficiently and effectively use verbal reasoning. This competency is characterized by the ability to verbally explain complex information to others. | |

TABLE 10

Table Ten - Technical-Professional Solutions

| | Solution Component | Definition | Items |
|---|---|---|---|
| | | Screening 8 Minutes | |
| Required | Dependability | This competency is characterized by: a willingness to behave in expected and agree upon ways; following through on assignments and commitments; keeping promises; and accepting the consequences of one's own actions. | 40 |
| | Interpersonal Skills | This competency is indexed by a tendency to be pleasant, cooperative, and helpful when working with others, as well as flexible in conflict resolution situations. | |
| | Self-Control | This competency is characterized by the ability to: stay calm and collected when confronted with adversity, frustration, or other difficult situations; and avoid defensive reactions or hurt feelings as a result of others' comments. | |
| | Energy | This competency is characterized by a preference to stay busy, active, and avoid inactive events or situations. | |
| | | Selection 35-50 Minutes | |
| Required | Business Leadership | Measures the candidate's thinking styles. High scorers are likely to have or learn good planning and organizing skills, be innovative, consider issues from multiple perspectives, and create strategies to build their business. | 32 |
| | Leadership Motivation | Measures the candidate's desire for achievement, drive, initiative, energy level, willingness to take charge, and persistence. High scorers are likely to be highly motivated to succeed and to set challenging goals for themselves and others. | 35 |
| | Self-Leadership | Measures the candidate's ability to control emotions, act with integrity, take responsibility for actions, and tolerate stress. High scorers are also likely to have a positive attitude, be optimistic about the future, | 34 |
| | Interpersonal Leadership | and demonstrate high levels of professionalism. Measures the candidate's interpersonal characteristics. High scorers are likely to persuade and influence others, gain commitment, and build effective interpersonal relationships. They also have potential to develop skills in the areas of employee relations, coaching, motivating, and leading a team. | 41 |
| | Decision Making/Problem Solving | Measures the tendency to efficiently and effectively use numerical and analytical reasoning. This competency is characterized by the ability to solve complex problems, and make reasoned decisions. | 10 |
| Optional | Communication | Measures the tendency to efficiently and effectively use verbal reasoning and effectively use verbal reasoning. This competency is characterized by the ability to verbally explain complex information to others. | 10 |

TABLE 11

Table Eleven - Executive Solutions

| | Solution Component | Definition | Items |
|---|---|---|---|
| | | Screening 20 Minutes | |
| Required | Executive Potential | Measures the potential for success in high-level organizational positions across industry type and functional area. Scores on Executive Potential are derived from candidates' responses to questions regarding work background, accomplishments, and career aspirations. | 53 |
| | | Selection 35-50 Minutes | |
| Required | Business Leadership | Measures the candidate's thinking styles. High scorers are likely to have or learn good planning and organizing skills, be innovative, consider issues from multiple perspectives, and create strategies to build their business. | 32 |
| | Leadership Motivation | Measures the candidate's desire for achievement, drive, initiative, energy level, willingness to take charge, and persistence. High scorers are likely to be highly motivated to succeed and to set challenging goals for themselves and others. | 35 |
| | Self-Leadership | Measures the candidate's ability to control emotions, | 34 |

TABLE 11-continued

Table Eleven - Executive Solutions

| | Solution Component | Definition | Items |
|---|---|---|---|
| | | act with integrity, take responsibility for actions, and tolerate stress. High scorers are also likely to have a positive attitude, be optimistic about the future, and demonstrate high levels of professionalism. | |
| | Interpersonal Leadership | Measures the candidate's interpersonal characteristics. High scorers are likely to persuade and influence others, gain commitment, and build effective interpersonal relationships. They also have potential to develop skills in the areas of employee relations, coaching, motivating, and leading a team. | 41 |
| | Decision Making/Problem Solving | Measures the tendency to efficiently and effectively use numerical and analytical reasoning. This competency is characterized by the ability to solve complex problems, and make reasoned decisions. | 10 |
| Optional | Communication | Measures the tendency to efficiently and effectively use verbal reasoning. This competency is characterized by the ability to verbally explain complex information to others. | 10 |

TABLE 12

Table Twelve - Campus Recruiting Solutions

| | Solution Component | Definition | Items |
|---|---|---|---|
| | Screening 12 Minutes | | |
| Required | Supervisory Potential | Measures potential for supervisory success across industry type and functional area. Scores on Supervisory Potential are derived from candidates' responses to questions regarding academic and social background, and aspirations concerning work. | 26 |
| | Judgment | Measures potential for making good judgments about how to effectively respond to work situations. Scores on Judgment are derived from candidates' responses to questions regarding situations one would likely encounter as a manager/supervisor. | |
| | Management Potential | Measures potential for managerial success across industry type and functional area. Scores on Management Potential are derived from candidates' responses to questions regarding academic and social background, and aspirations concerning work. Selection 20-35-50 Mins | |
| Required | Business Leadership | Measures the candidate's thinking styles. High scorers are likely to have or learn good planning and organizing skills, be innovative, consider issues from multiple perspectives, and create strategies to build their business. | 32 |
| | Leadership Motivation | Measures the candidate's desire for achievement, drive, initiative, energy level, willingness to take charge, and persistence. High scorers are likely to be highly motivated to succeed and to set challenging goals for themselves and others. | 35 |
| | Self-Leadership | Measures the candidate's ability to control emotions, act with integrity, take responsibility for actions, and tolerate stress. High scorers are also likely to have a positive attitude, be optimistic about the future, and demonstrate high levels of professionalism. | 34 |
| | Interpersonal Leadership | Measures the candidate's interpersonal characteristics. High scorers are likely to persuade and influence others, gain commitment, and build effective interpersonal relationships. They also have potential to develop skills in the area of employee relations, coaching, motivating, and leading a team. | 41 |
| Optional | Decision Making/Problem Solving | Measures the tendency to efficiently and effectively use numerical and analytical reasoning. This competency is characterized by the ability to solve complex problems, and make reasoned decisions. | 10 |
| Optional | Communication | Measures the tendency to efficiently and effectively use verbal reasoning. This competency is characterized by the ability to verbally explain complex information to others. | 10 |

TABLE 13

Table Thirteen - Communication Solution

| | Solution Component | Definition | Items |
|---|---|---|---|
| | Selection 37 Minutes | | |
| Required | Listening Orientation | Measure of the tendency to listen to and understand others' perspectives, to care for others, to accept and respect the individual differences of people, and to | 73 |

TABLE 13-continued

Table Thirteen - Communication Solution

| | Solution Component | Definition | Items |
|---|---|---|---|
| | | be open both to multiple ideas and to using alternative mode of thinking. | |
| | English Language Skills | Measures usage of verb tense and sentence construction. Scores on English Language Skills are derived from candidates responses to grammar questions. | |
| | Verbal Reasoning/Critical Thinking | Measures verbal reasoning skills and critical thinking/ reasoning skills. Scores on Verbal Reasoning Ability are derived from candidates' responses to analogies and questions about information provided in brief reading passages. | |

TABLE 14

Table Fourteen - Series Six/Seven Success Solution

| | Solution Component | Definition | Items |
|---|---|---|---|
| | Screening 36 Minutes | | |
| Required | Problem Solving | Measures the ability to analyze and evaluate information. Scores on Problem Solving are derived from candidates' responses to mathematical and analytical reasoning items, requiring candidates to response to facts and figures presented in various formats. | 20 |
| | Verbal Reasoning/Critical Thinking | Measures verbal reasoning skills and critical thinking/reasoning skills. Scores on Verbal Reasoning Ability are derived from candidates' responses to analogies and involves making inferences from information provided in the form of brief passages | |

TABLE 15

Table Fifteen - Information Technology Aptitude Solution

| | Solution Component | Definition | Items |
|---|---|---|---|
| | Screening 18 Minutes | | |
| Required | Critical Thinking | Measure reasoning and critical thinking skills. Scores on Critical Thinking are derived from candidates' responses to information provided in the form of brief passages. | 58 |
| | Problem Solving | Measure the ability to analyze and evaluate information. Scores on Problem Solving are derived from candidates' responses to mathematical and analytical reasoning items, requiring candidates to respond to facts and figures presented in various scenarios. | |
| | Communication | Measures the ability to efficiently use verbal information. Scores on Communication are derived from candidates' ability to identify synonyms. | |
| | Spatial Ability | Measure the ability to visually manipulate objects. Scores on Spatial Ability are derived from candidates' ability to correctly identify the number of blocks in progressively difficult figures. | |

Figure 13:
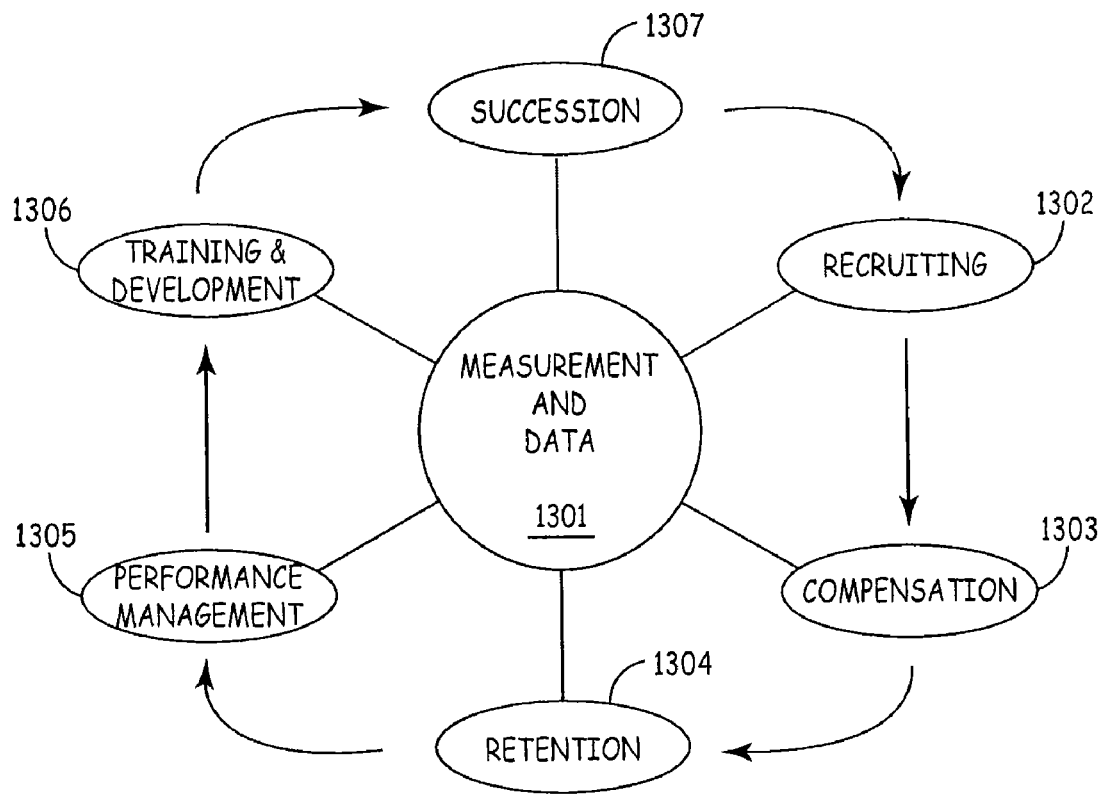
FIG. 13 illustrates a human capital management life-cycle.

Although the disclosure has focused on recruiting applications, the generated data may be used in other human capital applications. FIG. 13 illustrates a human capital management life-cycle. Measurement and data 1301 is initially used in the context of recruiting 1302. For recruiting 1302, screening, selection, and interview solutions measure applicants' competencies and predict on-the-job performance and thus contribution to business outcomes.

For compensation 1303, data about potential can be weighed against performance data to ensure that high potential employees who are on difficult assignments where they are structurally constrained from succeeding are not underpaid by pure focus on performance. For example, structural constraints may include business environments, poor staff, unreliable equipment, etc.

For retention 1304, businesses with jobs that high turnover use the system to ensure that applicants have qualities that contribute to longer tenure in roles.

For performance role 1305, the system can be used to enhance the validity of employee performance evaluation.

For training and development 1306, a company may test current employees in order to design executive training programs addressing each individual's strengths and weaknesses. Or, for employees that took a test and were hired despite weaknesses, the data can be used to structure appropriate training.

For succession 1307, data on employees may be collected in the process of organization mergers to assist planning for retrenchment or change. Also, by measuring competencies and mapping them between roles, it is possible to assess the potential that an individual may have for a role other than the job they are currently holding, such as for a promotion or a transfer to another area.

The foregoing description is to be considered as illustrative only. The skilled artisan will recognize many variations and permutations within the spirit of the disclosure.

The invention claimed is:

1. A computer-implemented method of screening and selecting persons for a position for an employer comprising:
providing an online screening solution that automatically determines if a given candidate is suitable for the position in response to a plurality of questions asked as part of the online screening solution;
providing an online selection solution having questions related to a plurality of competencies related to the position, the online selection solution being distinct from the online screening solution and including questions other than questions relating to background, knowledge and skills of the given candidate which have answers that are validated and correlated as being predictive of success for the position;

using a computer processing system to statistically correlate job performance ratings of a plurality of workers who were hired with previous answers given by the plurality of workers to the questions in the online selection solution before the plurality of workers was hired to validate and correlate the questions as being predictive of success for the position;

for candidates who are determined by the online screening solution to be suitable for the position, automatically creating a rank order of applicants from the candidates based at least in part on responses of the candidate as compared to the validated and correlated answers to questions in the online selection solution for the plurality of competencies; and making the rank order of such applicants available online to the employer as a dynamic filter for aiding in the selection of applicants for the position.

2. The computer-implemented method of claim 1, further comprising:
automatically rank ordering those candidates from the online screening solution; and
making the rank ordering of those candidates from the online screening solution available online to the employer.

3. The computer-implemented method of claim 2, further comprising:
permitting the employer to select which of those candidates from the online screening solution are permitted to use the online selection solution.

4. The computer-implemented method of claim 1, wherein:
the step of providing the online screening solution is provided without proctoring; and
the step of providing the online selection solution is provided with proctoring.

5. The computer-implemented method of claim 1, wherein:
the step of providing the online screening solution is accomplished by making the online screening solution accessible to candidates via at least one of an Internet website and an interactive telephonic interface.

6. The computer-implemented method of claim 1, wherein:
the step of providing the online screening solution includes presenting at least one knockout question to an applicant whereby the applicant is determined to be unsuitable for the position based on a response to a single question that forms the knockout question.

7. The computer-implemented method of claim 1, wherein the step of providing the online selection solution comprises:
utilizing a plurality of separably scorable sections of questions.

8. The computer-implemented method of claim 7, wherein the step of providing the online selection solution further comprises:
scoring each scorable section upon completion by the applicant; and
presenting questions for a next scorable section only if the applicant has successfully passed a previous scorable section.

9. The computer-implemented method of claim 8, further comprising:
providing a customized message to the candidate based on whether the applicant passed the previous scorable section.

10. The computer-implemented method of claim 7, wherein the step of providing the online selection solution comprises:
providing a first set of questions correlated to customer service;
providing a second set of questions correlated to working with information; and
providing a third set of questions correlated to sales potential.

11. The computer-implemented method of claim 10, wherein the step of providing the online selection solution further comprises:
as part of the rank order that is automatically created, generating scores for each of the first, second and third sets of questions to predict performance, potential and tenure of the applicants.

12. The computer-implemented method of claim 1, further comprising:
providing a customized message to the candidate based on the online screening solution determining whether the candidate is suitable for the position or not.

13. A computer-implemented method of screening candidates for a position for an employer comprising:
providing an online solution having a plurality of scorable sections of questions each related to a competency other than background, knowledge and skills of the candidates, wherein the questions have answers that are validated and correlated as being predictive of success for the position in terms of at least one of performance, potential and tenure of the candidates;
using a computer processing system to statistically correlate job performance ratings of a plurality of workers who were hired with previous answers given by the plurality of workers to the questions before the plurality of workers was hired;
automatically creating a rank order of candidates for the position based at least in part on responses of the candidate as compared to the validated and correlated answers to questions in the online solution, wherein the rank order includes scores for each of the plurality of scorable sections; and
making the rank order of such candidates available online to the employer as a dynamic filter for aiding in the screening of candidates for the position.

14. The computer-implemented method of claim 13, wherein:
the step of providing the online solution is accomplished by making the online solution accessible to candidates via at least one of an Internet website and an interactive telephonic interface.

15. The computer-implemented method of claim 13, wherein:
the step of providing the online solution further includes presenting at least one knockout question to a candidate whereby the candidate is determined to be unsuitable for the position based on a response to a single question that forms the knockout question.

16. A computer-implemented method of screening candidates for a position for an employer comprising:
providing an online solution having a plurality of scorable sections of questions each related to a competency other than background, knowledge and skills of the candidates, wherein the questions have answers that are validated and correlated as being predictive of success for the position in terms of at least one of performance, potential and tenure of the candidates;

using a computer processing system to statistically correlate job performance ratings of a plurality of workers who were hired with previous answers given by the plurality of workers to the questions before the plurality of workers was hired;

automatically creating a rank order of candidates for the position based at least in part on responses of the candidate as compared to the validated and correlated answers to questions in the online solution and including performing the steps of:

scoring each scorable section upon completion by the candidate; and presenting questions for a next scorable section only if the candidate has successfully passed a previous scorable section; and making the rank order of such candidates available online to the employer as a dynamic filter for aiding in the screening of candidates for the position.

17. The computer-implemented method of claim 16, further comprising:

providing a customized message to the candidate based on whether the candidate passed the previous scorable section.

* * * * *